(12) United States Patent
Kessel et al.

(10) Patent No.: US 8,442,804 B2
(45) Date of Patent: May 14, 2013

(54) METHOD AND APPARATUS FOR COMPOSITE PART DATA EXTRACTION

(75) Inventors: Jamie A. Kessel, Kent, WA (US); Phillip J. Fisher, Seattle, WA (US); Paul J. Shirron, Black Diamond, WA (US); Donald M. Mullins, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 742 days.

(21) Appl. No.: 12/192,168

(22) Filed: Aug. 15, 2008

(65) Prior Publication Data

US 2009/0112540 A1   Apr. 30, 2009

Related U.S. Application Data

(63) Continuation-in-part of application No. 11/924,107, filed on Oct. 25, 2007, now Pat. No. 8,321,180.

(51) Int. Cl.
*G06F 17/50* (2006.01)

(52) U.S. Cl.
USPC ............. 703/1; 703/6; 703/7; 700/97; 700/98

(58) Field of Classification Search .................. 703/1, 6, 703/7, 8
See application file for complete search history.

(56) References Cited

U.S. PATENT DOCUMENTS

| 3,711,934 | A | | 1/1973 | Zorowski et al. |
| 3,780,929 | A | * | 12/1973 | Terrasi ........................... 206/586 |
| 4,072,516 | A | | 2/1978 | Pepper et al. |
| 4,229,473 | A | | 10/1980 | Elber |
| 4,334,124 | A | * | 6/1982 | Imsand et al. ............. 178/20.02 |
| 4,498,139 | A | * | 2/1985 | Malinovsky .................. 345/168 |
| 4,666,546 | A | | 5/1987 | Treber |
| 4,849,913 | A | * | 7/1989 | Ward et al. ...................... 700/98 |
| 4,907,164 | A | * | 3/1990 | Guyder ......................... 700/173 |
| 5,006,990 | A | * | 4/1991 | Ward et al. ...................... 700/97 |
| 5,031,457 | A | * | 7/1991 | Kline .............................. 73/597 |
| 5,038,291 | A | * | 8/1991 | Wang et al. ..................... 700/98 |

(Continued)

FOREIGN PATENT DOCUMENTS

| EP | 1050396 A1 | 11/2000 |
| EP | 1296103 A2 | 3/2003 |

(Continued)

OTHER PUBLICATIONS

Prakash, "AUTOLAY—a GUI-based design and development software for laminated composite components", Computers and Graphics, Elsevier, GB, vol. 23, No. 1, Feb. 1999, pp. 95-110.

(Continued)

*Primary Examiner* — Omar Fernandez
*Assistant Examiner* — Kibrom Gebresilassie
(74) *Attorney, Agent, or Firm* — Yee & Associates, P.C.

(57) ABSTRACT

A computer implemented method for generating a section cut in a model of a part. A location on the part is identified. An axis system is created at the location in the model of the part, wherein the axis system has an axis that is normal to a surface at the location in the model of the part. Section cuts intersecting the surface and plies below the surface are created. A plurality of sampling points on the surface is identified based on the section cuts. Core sampling is preformed using the plurality of sampling points to generate sampled data.

23 Claims, 16 Drawing Sheets

U.S. PATENT DOCUMENTS

| | | | |
|---|---|---|---|
| 5,119,309 A * | 6/1992 | Cavendish et al. | 700/182 |
| 5,216,612 A | 6/1993 | Cornett et al. | |
| 5,452,407 A * | 9/1995 | Crook | 345/421 |
| 5,500,272 A | 3/1996 | Padden | |
| 5,984,511 A * | 11/1999 | Vasey-Glandon et al. | 703/6 |
| 6,030,483 A | 2/2000 | Wilson | |
| 6,041,132 A * | 3/2000 | Isaacs et al. | 382/100 |
| 6,052,631 A | 4/2000 | Busch et al. | |
| 6,138,056 A | 10/2000 | Hardesty et al. | |
| 6,253,218 B1 * | 6/2001 | Aoki et al. | 715/201 |
| 6,278,457 B1 * | 8/2001 | Bernardini et al. | 345/420 |
| 6,341,261 B1 * | 1/2002 | Vasey-Glandon et al. | 703/6 |
| 6,356,437 B1 * | 3/2002 | Mitchell et al. | 361/679.03 |
| 6,407,738 B1 * | 6/2002 | Wakabayashi | 345/424 |
| 6,445,390 B1 * | 9/2002 | Aftosmis et al. | 345/421 |
| 6,484,776 B1 * | 11/2002 | Meilunas et al. | 156/382 |
| 6,502,489 B2 | 1/2003 | Gerent et al. | |
| 6,625,618 B1 * | 9/2003 | Arai | 1/1 |
| 6,629,302 B2 | 9/2003 | Miura et al. | |
| 6,690,159 B2 | 2/2004 | Burreson et al. | |
| 6,799,081 B1 * | 9/2004 | Hale et al. | 700/98 |
| 6,819,966 B1 * | 11/2004 | Haeberli | 700/98 |
| 6,843,565 B2 | 1/2005 | Evans et al. | |
| 6,879,872 B2 * | 4/2005 | Fukumura | 700/165 |
| 6,959,235 B1 | 10/2005 | Abdel-Malek et al. | |
| 7,006,087 B2 * | 2/2006 | Takagi | 345/419 |
| 7,010,472 B1 * | 3/2006 | Vasey-Glandon et al. | 703/6 |
| 7,058,472 B2 | 6/2006 | Mathews et al. | |
| 7,076,323 B2 | 7/2006 | Vanderwiel | |
| 7,079,996 B2 | 7/2006 | Stewart et al. | |
| 7,099,725 B2 * | 8/2006 | Murrish et al. | 700/98 |
| 7,159,112 B1 * | 1/2007 | Williams | 713/168 |
| 7,171,344 B2 | 1/2007 | Lind | |
| 7,243,055 B2 * | 7/2007 | Chen et al. | 703/2 |
| 7,244,230 B2 | 7/2007 | Duggirala et al. | |
| 7,300,693 B2 | 11/2007 | Albers et al. | |
| 7,324,103 B2 | 1/2008 | Stewart et al. | |
| 7,365,747 B2 | 4/2008 | Finlayson et al. | |
| 7,366,643 B2 | 4/2008 | Verdura et al. | |
| 7,376,480 B2 * | 5/2008 | Hagen et al. | 700/118 |
| 7,407,556 B2 | 8/2008 | Oldani et al. | |
| 7,423,523 B2 | 9/2008 | Green | |
| 7,424,543 B2 | 9/2008 | Rice, III | |
| 7,513,965 B2 | 4/2009 | Oldani et al. | |
| 7,526,418 B2 * | 4/2009 | Pita et al. | 703/10 |
| 7,545,274 B2 | 6/2009 | Coop | |
| 7,555,404 B2 | 6/2009 | Brennan et al. | |
| 7,561,996 B2 | 7/2009 | Lu et al. | |
| 7,617,029 B2 | 11/2009 | Loda | |
| 7,651,756 B2 | 1/2010 | Albers et al. | |
| 7,720,561 B2 * | 5/2010 | Tang et al. | 700/122 |
| 7,747,421 B2 * | 6/2010 | Tang et al. | 703/7 |
| 7,751,917 B2 | 7/2010 | Rees et al. | |
| 7,761,183 B2 | 7/2010 | Sullivan | |
| 7,761,713 B2 | 7/2010 | Baar | |
| 7,769,481 B2 * | 8/2010 | Tang et al. | 700/119 |
| 7,809,454 B2 | 10/2010 | Hu et al. | |
| 7,809,531 B2 * | 10/2010 | Murrish | 703/1 |
| 7,809,679 B2 | 10/2010 | Nixon et al. | |
| 7,810,025 B2 | 10/2010 | Blair et al. | |
| 7,823,062 B2 * | 10/2010 | Liberty et al. | 715/234 |
| 7,869,982 B2 * | 1/2011 | Drumheller et al. | 703/1 |
| 7,875,333 B2 | 1/2011 | Stephan | |
| 7,912,602 B2 | 3/2011 | Sells et al. | |
| 7,983,809 B2 | 7/2011 | Kell et al. | |
| 8,103,101 B2 | 1/2012 | Fujiwara et al. | |
| 8,108,058 B2 * | 1/2012 | Murrish et al. | 700/97 |
| 8,165,703 B2 * | 4/2012 | Burgos Gallego et al. | 700/98 |
| 8,209,838 B2 | 7/2012 | Lindgren | |
| 8,285,407 B2 * | 10/2012 | Kessel et al. | 700/98 |
| 8,321,180 B2 * | 11/2012 | Kessel et al. | 703/1 |
| 2001/0045148 A1 * | 11/2001 | Gerent et al. | 83/49 |
| 2001/0047508 A1 * | 11/2001 | Miura et al. | 716/8 |
| 2002/0077752 A1 | 6/2002 | Burreson et al. | |
| 2002/0077968 A1 * | 6/2002 | Kaniwa et al. | 705/38 |
| 2002/0174010 A1 | 11/2002 | Rice, III | |
| 2002/0183986 A1 * | 12/2002 | Stewart et al. | 703/2 |
| 2003/0055812 A1 | 3/2003 | Williams et al. | |
| 2003/0080957 A1 * | 5/2003 | Stewart et al. | 345/420 |
| 2003/0120472 A1 | 6/2003 | Lind | |
| 2003/0145017 A1 | 7/2003 | Patton et al. | |
| 2003/0191554 A1 * | 10/2003 | Russell et al. | 700/187 |
| 2004/0021828 A1 | 2/2004 | Evans et al. | |
| 2004/0024661 A1 | 2/2004 | Freel et al. | |
| 2004/0139330 A1 * | 7/2004 | Baar | 713/182 |
| 2004/0147840 A1 | 7/2004 | Duggirala et al. | |
| 2004/0177060 A1 | 9/2004 | Nixon et al. | |
| 2004/0236561 A1 | 11/2004 | Smith et al. | |
| 2005/0055181 A1 | 3/2005 | Verdura et al. | |
| 2005/0119774 A1 * | 6/2005 | Murrish et al. | 700/98 |
| 2005/0240291 A1 * | 10/2005 | Oldani et al. | 700/57 |
| 2005/0241261 A1 * | 11/2005 | Martinez-Cepeda | 52/737.6 |
| 2005/0247396 A1 * | 11/2005 | Oldani et al. | 156/173 |
| 2006/0015777 A1 | 1/2006 | Loda | |
| 2006/0041840 A1 | 2/2006 | Blair et al. | |
| 2006/0066609 A1 | 3/2006 | Iodice et al. | |
| 2006/0119601 A1 | 6/2006 | Finlayson et al. | |
| 2006/0265198 A1 * | 11/2006 | Kanai et al. | 703/2 |
| 2006/0291724 A1 | 12/2006 | Fujiwara et al. | |
| 2007/0073429 A1 | 3/2007 | Rees et al. | |
| 2007/0106418 A1 * | 5/2007 | Hagen et al. | 700/186 |
| 2007/0150087 A1 * | 6/2007 | Tang et al. | 700/119 |
| 2007/0191982 A1 * | 8/2007 | Sullivan | 700/182 |
| 2007/0236354 A1 | 10/2007 | Green | |
| 2007/0241908 A1 | 10/2007 | Coop | |
| 2007/0244590 A1 * | 10/2007 | Menayo et al. | 700/98 |
| 2008/0312764 A1 | 12/2008 | Murrish | |
| 2009/0005928 A1 | 1/2009 | Sells et al. | |
| 2009/0043533 A1 | 2/2009 | Brennan et al. | |
| 2009/0076638 A1 * | 3/2009 | Hu et al. | 700/97 |
| 2009/0112820 A1 * | 4/2009 | Kessel et al. | 707/3 |
| 2009/0112973 A1 * | 4/2009 | Kessel et al. | 709/203 |
| 2009/0126847 A1 * | 5/2009 | Kobayashi | 152/527 |
| 2009/0138139 A1 * | 5/2009 | Tsai et al. | 701/3 |
| 2010/0042283 A1 | 2/2010 | Kell et al. | |
| 2010/0161095 A1 | 6/2010 | Lindgren | |
| 2010/0170985 A1 * | 7/2010 | Flood | 244/117 R |
| 2011/0047251 A1 | 2/2011 | Seo | |
| 2011/0082681 A1 * | 4/2011 | Teramae et al. | 703/14 |
| 2011/0087463 A1 * | 4/2011 | Nakhle et al. | 703/1 |
| 2012/0045606 A1 | 2/2012 | Griess et al. | |

FOREIGN PATENT DOCUMENTS

| | | |
|---|---|---|
| EP | 1503301 A2 | 2/2005 |
| EP | 1840775 A | 10/2007 |
| JP | 2000298734 | 10/2000 |
| JP | 2004264993 A | 9/2004 |
| JP | 2006350499 A | 12/2006 |
| WO | WO0056541 A1 | 9/2000 |
| WO | 2009055201 A | 4/2009 |
| WO | WO2009070410 A1 | 6/2009 |
| WO | WO2010019328 A1 | 2/2010 |
| WO | WO2011046686 A1 | 4/2011 |
| WO | WO2012024023 A1 | 2/2012 |

OTHER PUBLICATIONS

USPTO Final office action for U.S. Appl. No. 11/924,108 dated Dec. 27, 2010.

PCT search report for application PCT/US2010/047886 dated Jan. 25, 2011.

Ding et al., "XML-based Representations in Product Lifecycle Management", 11th international Conference on Computer Supported Cooperative Work in Design, 2007, IEEE, Apr. 1, 2007 pp. 762-767.

Guillermin et al., "Advanced CAD Software Tools for Cost Effective Composite Engineering", International SAMPE Symposium and Exhibition, vol. 2, May 6, 2001, pp. 1899-1910.

Prakash et al., "Computer Graphics in the Design and Manufacture of Composite Laminate Components", Computers and Graphics, Elsevier, GB, vol. 17 No. 4, Jul. 1, 1993, pp. 407-413.

Li et al., "Research on the Collaborative Virtual Products Development Based on Web and X3D", IEEE 6th International Conference on Artificial Reality and Telexistence-workshops, 2006, ICAT'06, Nov. 1, 2006, pp. 141-144.

USPTO office actionf or U.S. Appl. No. 11/924,107 dated Sep. 1, 2010.

Kanga, "Application of Intelligent Computer-Aided Design techniques to Power Plant Design and Operation", IEEE Transactions on Energy Conversion, NJ, vol. EC-2, No. 4, Dec. 1, 1987, pp. 592-597.

Prakash, "Autolay—a GUI-based design and development software for laminated composite components", Computers and Graphics, Elsevier, GB, vol. 23, No. 1, Feb. 1, 1999, pp. 95-110.

PCT Search & Written Opinion for PCT/US2009/049931 dated Oct. 15, 2009.

Amendment pursuant to request for continued examination dated Mar. 17, 2011 regarding U.S. Appl. No. 11/924,107, 25 Pages.

USPTO non-final office action dated Dec. 27, 2010 regarding U.S. Appl. No. 11/924,107, 21 Pages.

USPTO final office action dated Dec. 7, 2011 regarding U.S. Appl. No. 11/924,107, 32 Pages.

Response to office action dated Nov. 17, 2010 regarding U.S. Appl. 11/924,107, 16 Pages.

Response to office action dated Mar. 7, 2012 regarding U.S. Appl. No. 11/924,107, 17 Pages.

Appeal Brief dated Jan. 30, 2012 regarding U.S. Appl. No. 12/192,162, 35 Pages.

USPTO final office action dated Nov. 9, 2011 regarding U.S. Appl. No. 12/192,162, 14 Pages.

USPTO non-final office Action dated Jul. 20, 2011 regarding U.S. Appl. No. 12/192,162, 29 Pages.

USPTO notice of allowance dated Feb. 17, 2012 regarding U.S. Appl. No. 12/192,162, 9 Pages.

Response to office action dated Oct. 20, 2011 regarding U.S. Appl. No. 12/192,162, 16 Pages.

PCT search report dated Jun. 8, 2009 regarding PCT/US2008078095, applicant The Boeing Company, 4 Pages.

USPTO Notice of Allowance, dated May 21, 2012, regarding U.S. Appl. No. 12/192,162, 14 pages.

International Search Report and Written Opinion of the International Searching Authority, dated Mar. 5, 2009, regarding Application No. PCT/US2008/081793, 14 pages.

International Search Report and Written Opinion of the International Searching Authority, dated Aug. 5, 2011, regarding Application No. PCT/US2011/041519, 10 pages.

Cera et al., "Role-based viewing envelopes for information protection in collaborative modeling," Computer-Aided Design, col. 36, No. 9, Aug. 2004, pp. 873-886.

Fink et al., "Hybrid CFRP/titanium bolted joints: Performance assessment and application to a spacecraft payload adaptor," Composites Science and Technology, Feb. 2010, vol. 70, Issue 2, pp. 305-317.

Griess et al., "Multi-Layer Metallic Structure and Composite-to-Metal Joint Methods," U.S. Appl. No. 13/443,687, filed Apr. 2012, 55 pages.

Kolesnikov et al., "CFRP/titanium hybrid materials for improving composite bolted joints," Composites Structures, Jun. 2008, vol. 83, No. 4, pp. 368-380.

Office Action, dated Apr. 29, 2011, regarding U.S. Appl. No. 11/945,121, 16 pages.

Final Office Action, dated Oct. 28, 2011, regarding U.S. Appl. No. 11/945,121, 15 pages.

Notice of Allowance, dated Jul. 20, 2012, regarding U.S. Appl. No. 11/924,107, 18 pages.

Griess et al., "Composite Structures Having Composite-To-Metal Joints and Method for Making the Same," U.S. Appl. No. 13/716,171 and Preliminary Amendment, filed Dec. 16, 2012, 39 pages.

Song et al., "Synthesis of the digital mock-up system for heterogeneous CAD assembly," Computers in Industry, Jun. 2009, vol. 60, No. 5, pp. 285-295.

Office Action, dated Dec. 14, 2012, regarding U.S. Appl. No. 12/578,314, 54 pages.

Office Action, dated Nov. 13, 2012 regarding U.S. Appl. No. 12/857,835, 14 pages.

* cited by examiner

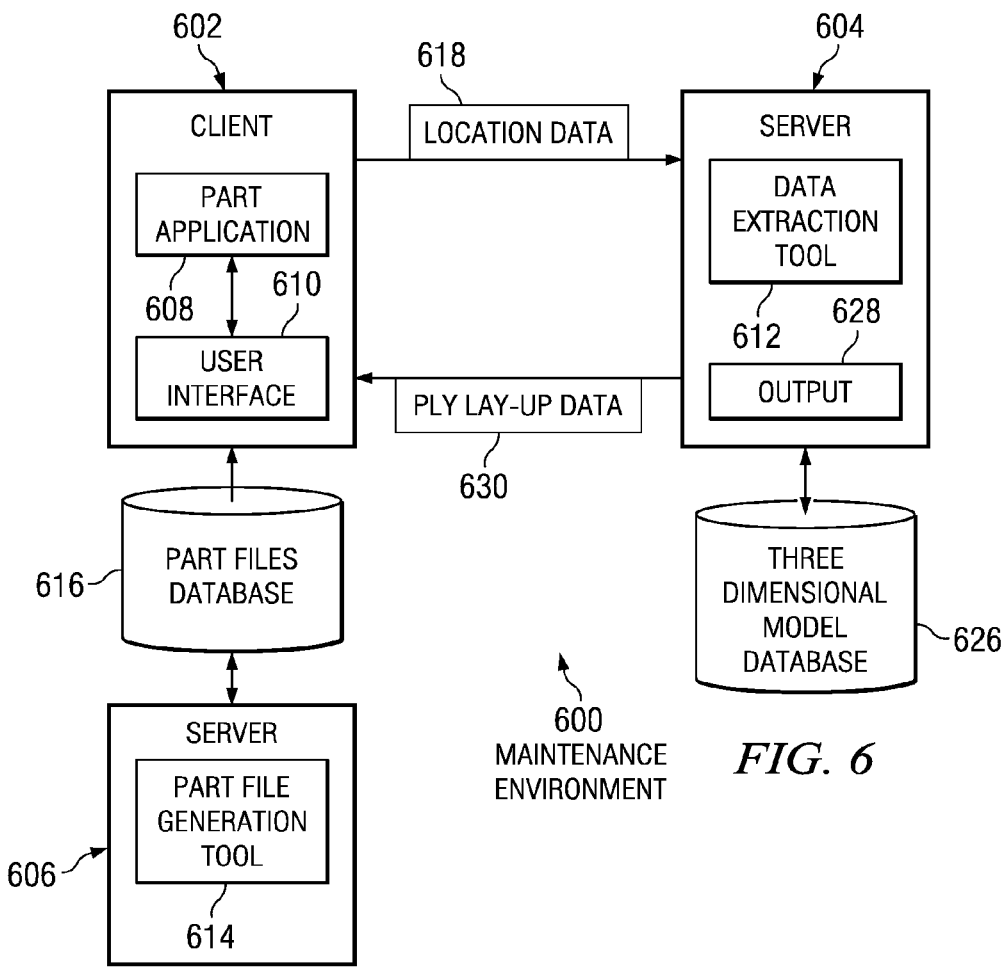
FIG. 6
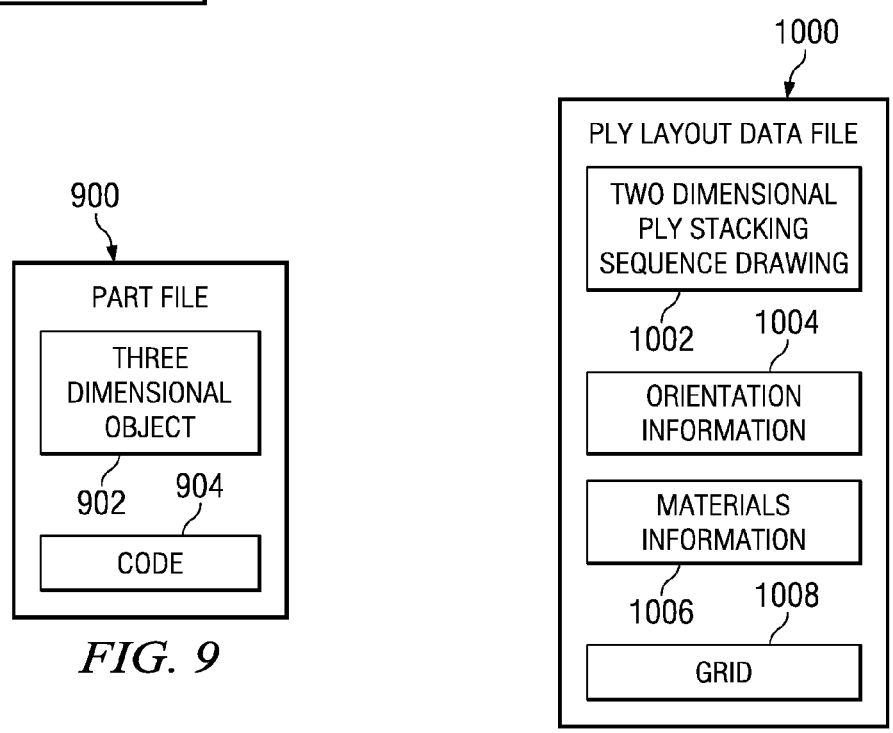
FIG. 9
FIG. 10

Composite Material Part Search — 1200

- 1202 Model: 787
- 1206 Customer Code: UAL ☑ All Codes
- 1204 Part Number *: 2
- 1208 Part Name *: 
- Find Product — 1210
- Product *:

Find Airplane
- 1212 Airplane ID Type: Line Number
- 1214 From airplane: 0001
- 1216 To: 0002

At least one * field is required   [Search] 1218   [Reset] 1220   (?)

1235 items found. Displaying 1 to 25   1 2 3 4 5 6 7 8 9 Next

| Part Number / Part Name | Revision / Status | | Submit request for CPL Section Cuts |
|---|---|---|---|
| 24CAM BRACKET — 1300 | --B Approved | 1308 | Submit request (manual) — 1316 |
| 26ARM PEN — 1302 | --B Approved | 1310 | Submit request (manual) — 1318 |
| 28DP7 BALL — 1304 | --A Approved | 1312 | Submit request (manual) — 1320 |
| 28DP6 BALL — 1306 | --A Approved | 1314 | Submit request (manual) — 1322 |

1 2 3 4 5 6 7 8 9 Next

*FIG. 13*

METHOD AND APPARATUS FOR COMPOSITE PART DATA EXTRACTION

CROSS REFERENCE TO RELATED APPLICATIONS

The present invention is a continuation-in-part (CIP) of and claims priority from the following patent application: entitled "Method and Apparatus for Composite Part Data Extraction", Ser. No. 11/924,107, filed Oct. 25, 2007, now U.S. Pat. No. 8,321,180, and is related to the following patent application: entitled "Method and Apparatus for Composite Part Data Extraction", Ser. No. 12/192,162, filed Aug. 15, 2008, now U.S. Pat. No. 8,285,407, and all of which are incorporated herein by reference.

BACKGROUND INFORMATION

1. Field

The present disclosure relates generally to composite parts and in particular to a method and apparatus for obtaining information about composite parts. Still more particularly, the present disclosure relates to a computer implemented method, apparatus, and computer usable program product for obtaining ply lay-up data for composite parts.

2. Background

Aircraft are being designed and manufactured with ever increasing percentages of composite materials. Some aircraft may have more than fifty percent of its primary structure made from composite materials. Composite materials are used in aircraft to decrease the weight of the aircraft. This decreased weight improves performance features, such as payload capacities and fuel efficiencies. Further, composite materials provide longer service life for various parts in an aircraft.

Composite materials are strong, light-weight materials, created by combining two or more dissimilar components. For example, a composite may include fibers and resins. The fibers and resins are combined and cured to form a composite material.

Further, by using composite materials, parts of an aircraft may be created in larger sections with fewer pieces, eliminating many fasteners. For example, the fuselage of an aircraft may be created in cylindrical sections with integral stringers. Another example is a stabilizer of an aircraft which may be created as a single piece incorporating spars and upper and lower skins with integral stiffeners.

When performing repairs on damaged aircraft composite parts, ply lay-up data, such as an identification of the number of plies, orientation of each ply, the location of each ply within the composite part, the ply material and the cured part thickness, is needed to replace the damaged material.

In some instances, two dimensional drawings may be present in a manual. Details of composite parts in these drawings include ply lay-up and part thickness data. This information includes an identification of each ply, the orientation of the ply, the location of the ply in the lay-up, the ply material, as well as thickness information for the part itself. This type of data is typically used to perform repairs to composite parts.

SUMMARY

In one advantageous embodiment, a computer implemented method is present for generating a section cut in a model of a part. A location on the part is identified. An axis system is created at the location in the model of the part, wherein the axis system has an axis that is normal to a surface at the location in the model of the part. Section cuts intersecting the surface and plies below the surface are created. A plurality of sampling points on the surface is identified based on the section cuts. Core sampling is preformed using the plurality of sampling points to generate sampled data.

In another advantageous embodiment, an apparatus comprises a data extraction tool and a data processing system. The data extraction tool is capable of identifying a location on a part; creating an axis system at the location in the model of the part, wherein the axis system has an axis that is normal to a surface at the location in the model of the part; creating section cuts intersecting the surface and plies below the surface; identifying a plurality of sampling points on the surface based on the section cuts; and performing core sampling using the plurality of sampling points to generate sampled data. The data extraction tool executes on the data processing system.

In yet another advantageous embodiment, a computer program product comprises a computer recordable storage medium and program code stored on the computer recordable storage medium. Program code is present for identifying a location on a part. Program code also is present for creating an axis system at the location in a model of the part, wherein the axis system has an axis that is normal to a surface at the location in the model of the part. Program code also is capable of creating section cuts intersecting the surface and plies below the surface. Program code is present for identifying a plurality of sampling points on the surface based on the section cuts. Program code also is capable of performing core sampling using the plurality of sampling points to generate sampled data.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 6 is a block diagram illustrating components used to provide ply lay-up data for a composite part in accordance with an advantageous embodiment;

FIG. 9 is a diagram illustrating a part file in accordance with an advantageous embodiment;

FIG. 10 is a diagram illustrating ply layout data in accordance with an advantageous embodiment;

FIG. 13 is a diagram illustrating a user interface for searching for composite parts in accordance with an advantageous embodiment;

DETAILED DESCRIPTION

Figure 1:
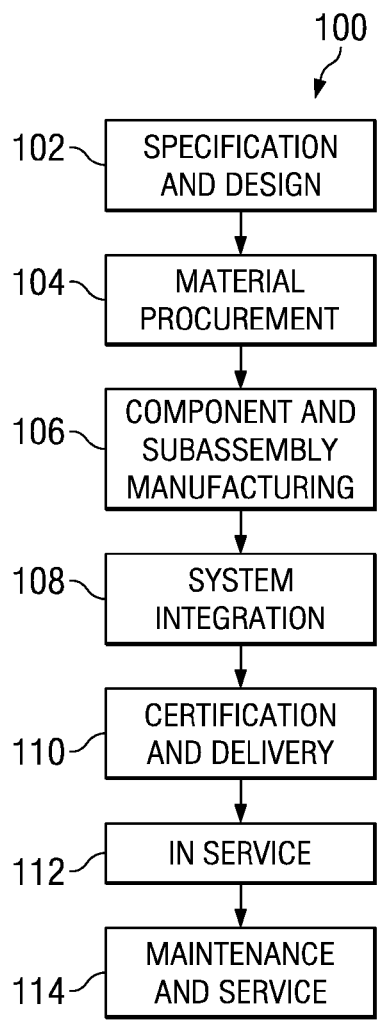
FIG. 1 is a diagram illustrating an aircraft manufacturing and service method in which an advantageous embodiment may be implemented.
Figure 2:
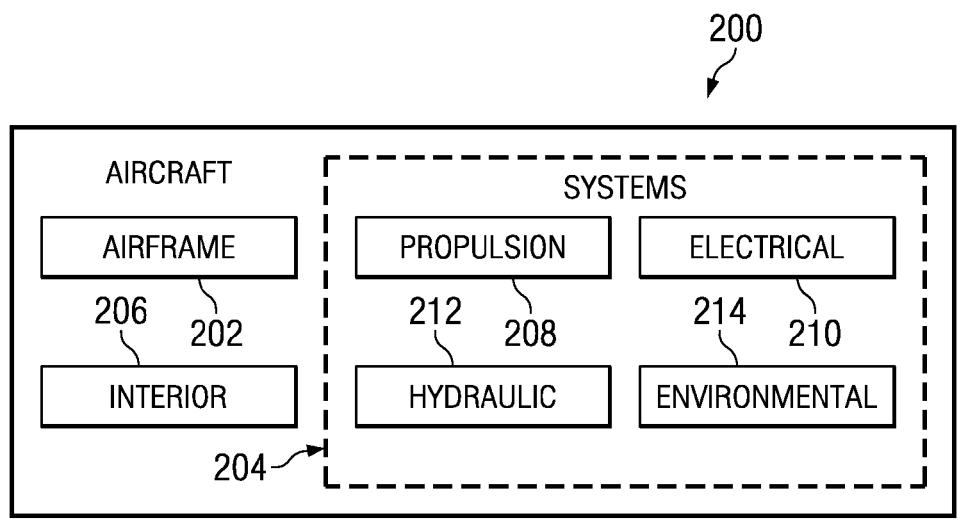
FIG. 2 is a diagram of an aircraft in accordance with an advantageous embodiment.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, part and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automobile industry and the boat and ship building industry.

Apparatus and methods embodied herein may be employed during any one or more of the stages of aircraft manufacturing and service method 100 in FIG. 1. For example, parts or subassemblies produced in part and subassembly manufacturing 106 in FIG. 1 may be fabricated or manufactured in a manner similar to parts or subassemblies repaired or modified while aircraft 200 is in service 112 in FIG. 1.

Also, one or more apparatus embodiments, method embodiments, or a combination thereof may be utilized during production stages, such as part and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 in FIG. 1 or during maintenance and service 114 in FIG. 1. More specifically, the different advantageous embodiments may be used during maintenance and service 114 in FIG. 1 to provide ply lay-up data for use in maintenance operations, such as, for example, repair or modification of composite parts.

Figure 3:
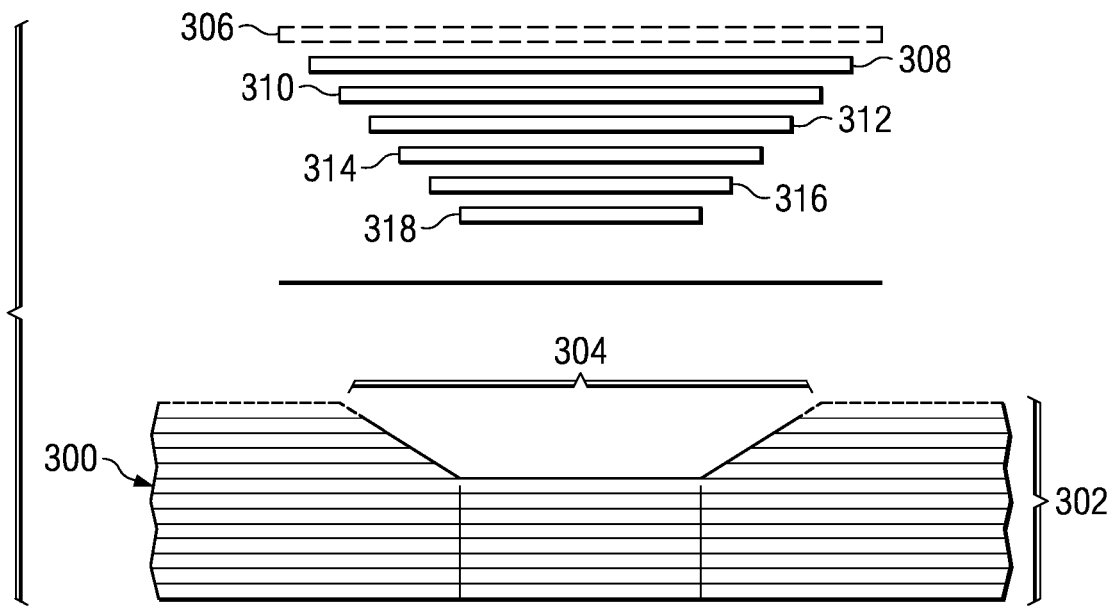
FIG. 3 is a diagram illustrating a cross-section of a portion of an aircraft in accordance with an advantageous embodiment.

Turning to FIG. 3, a diagram illustrating a cross-section of a portion of an aircraft is depicted in accordance with an advantageous embodiment. In this example, part 300 is a composite part having plies 302. Part 300 may be, for example, without limitation, a portion of a fuselage, a wing, a stabilizer, or some other portion of an aircraft.

In this particular example, damage has occurred in section 304. Plies 302 may have different orientations and may include different materials in this particular example. To perform maintenance and/or repair on section 304 of part 300, knowledge of the ply lay-up data may be needed to properly repair part 300. Ply lay-up data is data describing the plies within a part. Ply lay-up data may include, for example, without limitation, ply stacking sequences, ply orientation, and ply materials. This type of data may be found within three dimensional models containing the composite part.

In this particular example, plies 306, 308, 310, 312, 314, 316, and 318 are used to perform the repair of section 304. These different plies are selected to have the same sequence, orientation, and materials to match up to plies within plies 302 to perform the repair, in this example.

The different illustrative embodiments recognize that although two dimensional drawings are currently used, if those drawings are unavailable, maintenance on composite parts would become more difficult. The different illustrative embodiments recognize that one potential solution is to extract the ply lay-up data from the three dimensional models themselves. These three dimensional models are engineering data sets that may be managed by a computer aided design program.

The different illustrative embodiments recognize that one potential solution to this problem is that the data for the composite parts may be extracted from the three dimensional models by the manufacturer or suppliers in advance for every composite part, or on demand during fleet support of the aircraft.

These types of solutions, however, have been recognized by the advantageous embodiments to be cost prohibitive, in many cases, depending on the quantity of the composite parts for a particular aircraft. Further, providing this information on demand may not comply with service level agreements between the aircraft manufacturer and customers.

Another potential solution is to provide the three dimensional models to the customers. This potential solution is recognized by the different illustrative embodiments also as being undesirable, in many cases, because of the requirements for the customers. For example, to view the models, customers would require access or use of computer aided design programs or viewers for those programs. These types of programs and viewers may have a cost that is unattractive to customers. Also, in addition to the cost for the additional software needed to extract the information, the customers also would need to have users that are trained to use the programs to locate the composite lay-up data for particular locations in the aircraft.

Another potential issue recognized by the advantageous embodiments is that the three dimensional models or information in the three dimensional models may be trade secret. This data may include specification and performance information about the aircraft. Other trade secret information in these models includes, for example, without limitation, architectural and structural information for the different parts of the aircraft, as well as their integration to form the aircraft. As a result, a manufacturer is often unwilling to provide these models to customers or maintenance companies.

Another potential issue recognized by the advantageous embodiments is that the three dimensional models or information in the three dimensional models may be regulated by export laws in the United States and other countries. This data may include production or development information about composite materials or laminates. Other export controlled information in these models includes, for example, without limitation, composite material properties, and the design of tools used to manufacture composite parts. As a result, a manufacturer is often legally unable to provide these models to customers or maintenance companies.

In recognizing the potential for an absence of two dimensional drawings and the other issues related with existing three dimensional models, the different advantageous embodiments provide a method, apparatus, and computer program product for obtaining ply lay-up data for composite parts.

Figure 4:
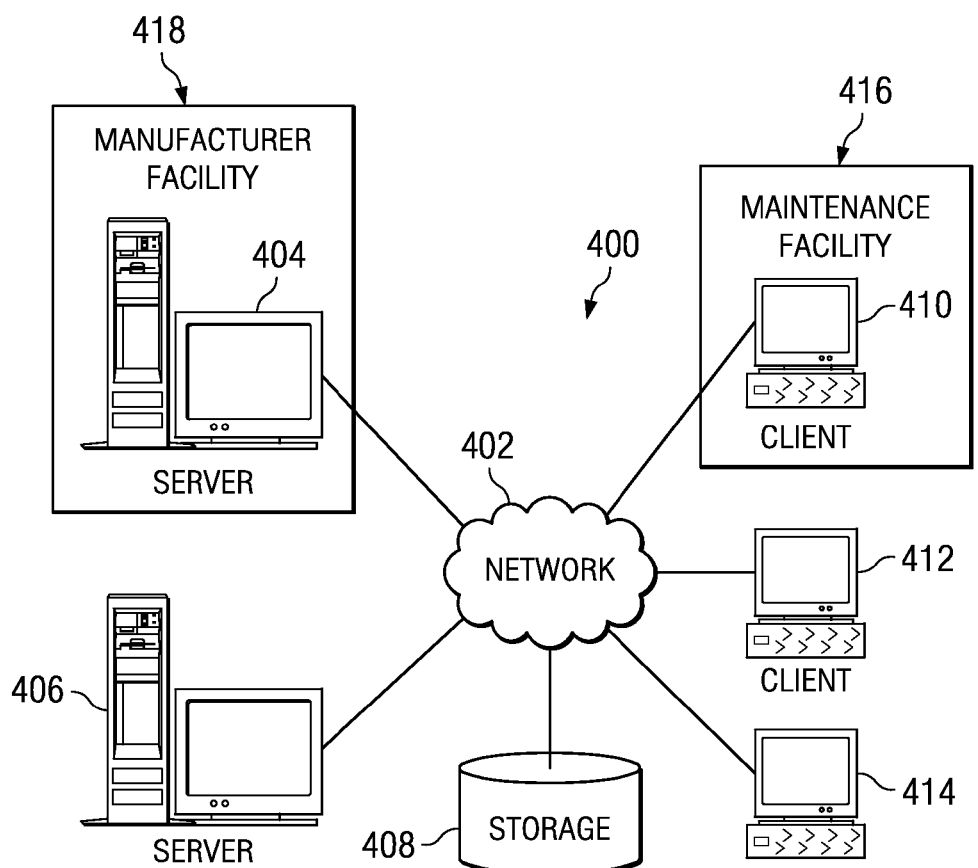
FIG. 4 is a pictorial representation of a network of data processing systems in which advantageous embodiments may be implemented.
Figure 5:
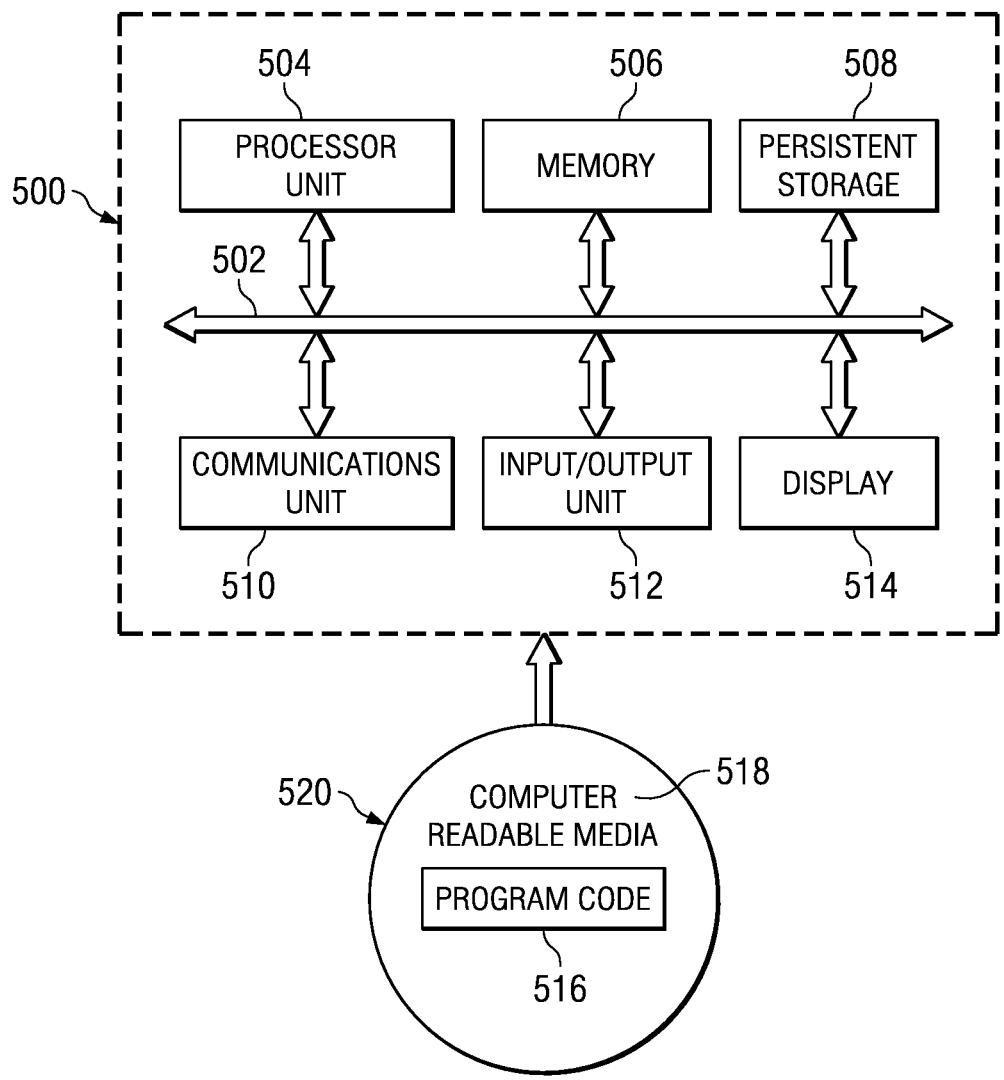
FIG. 5 is a block diagram of a data processing system in which illustrative embodiments may be implemented.

With reference now to FIGS. 4-5, exemplary diagrams of data processing environments are provided in which advantageous embodiments may be implemented. It should be appreciated that FIGS. 4-5 are only exemplary and are not intended to assert or imply any limitation with regard to the environments in which the different embodiments may be implemented. Many modifications to the depicted environments may be made.

FIG. 4 is a pictorial representation of a network of data processing systems in which advantageous embodiments may be implemented. Network data processing system 400 is an example of a hardware environment in which different advantageous embodiments may be implemented. Specifically, network data processing system 400 may be used to implement an environment providing ply lay-up data for use in performing maintenance activities.

Network data processing system 400 is a network of computers in which the illustrative embodiments may be implemented. Network data processing system 400 contains network 402, which is the medium used to provide communications links between various devices and computers connected together within network data processing system 400. Network 402 may include connections, such as wire, wireless communication links, or fiber optic cables.

In the depicted example, server 404 and server 406 connect to network 402 along with storage unit 408. In addition, clients 410, 412, and 414 connect to network 402. Clients 410, 412, and 414 may be, for example, workstation computers or network computers. In the depicted example, server 404 provides data, such as boot files, operating system images, and applications to clients 410, 412, and 414. Clients 410, 412, and 414 are clients to server 404 in this example.

As depicted, client 410 is located in maintenance facility 416, while server 404 is located in manufacturer facility 418. Maintenance facility 416 is a location where maintenance and repairs may be performed on aircraft. The maintenance and repairs are referred to collectively as maintenance operations. Manufacturer facility 418 is a location where three dimensional models for aircraft may be created and/or maintained.

In these different examples, server 404 in manufacturer facility 418 may provide ply lay-up data for use in performing maintenance and repairs on aircraft to client 410 at maintenance facility 416. Manufacturer facility 418 may be owned by the same or separate entities from maintenance facility 416.

The ply lay-up data may be provided using network data processing system 400 in a manner that avoids some or all of the issues associated with an unavailability of two dimensional drawings and manuals or another hard copy form. For example, this data may be provided in a manner that avoids having a customer purchase and operate computer aided design software to view three dimensional models.

The different embodiments also may be used to limit the amount of data that is provided to other parties or users. The manufacturer of the aircraft does not need to supply three dimensional models that may contain confidential data to customers. Instead, only data relating to the ply lay-up of the part for which maintenance is being performed is provided, in the different examples.

Network data processing system 400 may include additional servers, clients, and other devices not shown. In the depicted example, network data processing system 400 is the Internet with network 402 representing a worldwide collection of networks and gateways that use the Transmission Control Protocol/Internet Protocol (TCP/IP) suite of protocols to communicate with one another.

At the heart of the Internet is a backbone of high-speed data communication lines between major nodes or host computers, consisting of thousands of commercial, governmental, educational and other computer systems that route data and messages. Of course, network data processing system 400 also may be implemented as a number of different types of networks, such as for example, an intranet, a local area network (LAN), or a wide area network (WAN). FIG. 4 is intended as an example, and not as an architectural limitation for the different embodiments.

With reference now to FIG. 5, a block diagram of a data processing system is shown in which illustrative embodiments may be implemented. Data processing system 500 is an example of a computer, such as server 404 or client 410 in FIG. 4, in which computer usable program code or instructions implementing the processes may be located for the illustrative embodiments. In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a set of one or more processors or may be a multi-processor core, depending on the particular implementation. Further, processor unit 504 may be implemented using one or more heterogeneous processor systems in which a main processor is present with secondary processors on a single chip. As another illustrative example, processor unit 504 may be a symmetric multi-processor system containing multiple processors of the same type.

Memory 506, in these examples, may be, for example, a random access memory or any other suitable volatile or non-volatile storage device. Persistent storage 508 may take various forms depending on the particular implementation. For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard and mouse. Further, input/output unit 512 may send output to a printer. Display 514 provides a mechanism to display information to a user.

Instructions for the operating system and applications or programs are located on persistent storage 508. These instructions may be loaded into memory 506 for execution by processor unit 504. The processes of the different embodiments may be performed by processor unit 504 using computer implemented instructions, which may be located in a memory, such as memory 506. These instructions are referred to as program code, computer usable program code, or computer readable program code that may be read and executed by a processor in processor unit 504. The program code in the different embodiments may be embodied on different physical or tangible computer readable media, such as memory 506 or persistent storage 508.

Program code 516 is located in a functional form on computer readable media 518 and may be loaded onto or transferred to data processing system 500 for execution by processor unit 504. Program code 516 and computer readable media 518 form computer program product 520 in these examples. In one example, computer readable media 518 may be in a tangible form, such as, for example, an optical or magnetic disc that is inserted or placed into a drive or other device that is part of persistent storage 508 for transfer onto a storage device, such as a hard drive that is part of persistent storage 508. In a tangible form, computer readable media 518 also may take the form of a persistent storage, such as a hard drive or a flash memory that is connected to data processing system 500. The tangible form of computer readable media 518 is also referred to as computer recordable storage media.

Alternatively, program code 516 may be transferred to data processing system 500 from computer readable media 518 through a communications link to communications unit 510 and/or through a connection to input/output unit 512. The communications link and/or the connection may be physical or wireless in the illustrative examples. Computer readable media 518 also may take the form of non-tangible media, such as communications links or wireless transmissions containing the program code.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown.

As one example, a storage device in data processing system 500 is any hardware apparatus that may store data. Memory 506, persistent storage 508 and computer readable media 518 are in a tangible form. In another example, a bus system may be used to implement communications fabric 502 and may be comprised of one or more buses, such as a system bus or an input/output bus.

Of course, the bus system may be implemented using any suitable type of architecture that provides for a transfer of data between different components or devices attached to the bus system. Additionally, a communications unit may include one or more devices used to transmit and receive data, such as a modem or a network adapter. Further, memory may be, for example, memory 506 or a cache such as found in an interface and memory controller hub that may be present in communications fabric 502.

The different advantageous embodiments provide a computer implemented method, apparatus, and computer usable program product for locating ply lay-up data for a composite part. In the different examples, a designation of a location for a composite part is received. The location of the composite part is used to extract ply lay-up data for a section of the composite part within a three dimensional model to form extracted ply lay-up data sent to the requester.

In these examples, this extracted ply lay-up data is sent in a format allowing the requester to perform maintenance on the composite part without having access to a three dimensional model containing the composite part. Further, the different advantageous embodiments provide this information without requiring a user or operator to have access to or have knowledge to operate a computer aided design program.

Turning now to FIG. 6, a block diagram illustrating components used to provide ply lay-up data for a composite part is depicted in accordance with an advantageous embodiment. In this example, maintenance environment 600 is an environment in which lay-up data for composite parts may be identified for use in performing maintenance operations.

As depicted, maintenance environment 600 includes client 602, server 604, and server 606. Client 602 includes part application 608 and user interface 610. Server 604 includes data extraction tool 612, and server 606 contains part file generation tool 614. In these examples, client 602 may be, for example, client 410 located in maintenance facility 416 in FIG. 4. Server 604 may be implemented using server 404 in maintenance facility 418 in FIG. 4. Also, server 606 may be implemented using the same server or another server, such as server 406 in FIG. 4.

These maintenance operations may include repairs of composite parts, such as composite part 300 in FIG. 3. Part application 608 may access part files database 616 to identify the composite part in part files database 616. Further, when a user or other operator of part application 608 selects or identifies a part, part application 608 may display a three dimensional representation of the part on user interface 610 to identify a location on the composite part for maintenance. For example, the user may select a particular location on a three dimensional object of a part displayed through user interface 610 to indicate the location at which a repair or other maintenance operation is to occur for that composite part.

The selection of this location generates location data 618. In these examples, location data 618 may be three dimensional coordinates defining a location on the composite part that needs maintenance. More specifically, location data 618 includes the location in X, Y, and Z coordinates. Of course, other coordinate systems may be used, depending on the particular implementation.

As another example, a spherical coordinate system may be used to identify the location of the composite part. Further, location data 618 also may include an identification of the composite part. This identification may be, for example, a part number. Location data 618 also may include, for example, without limitation, an identification of the type of aircraft or even a specific aircraft using a tail number.

Data extraction tool 612 executing on server 604 receives location data 618 from part application 608. Data extraction tool 612 may be a separate program or application which makes calls to a computer aided design application to obtain access to three dimensional models. In other embodiments, data extraction tool 612 may take the form of a process that is part of the computer aided design application. In these examples, the computer aided application may be, for example, CATIA V5R17. This type of program is available from Dassault Systemes.

When implemented as a separate application, data extraction tool 612 may access files for three dimensional models within three dimensional model database 626 in a number of different ways. For example, data extraction tool 612 may directly access these files. In other embodiments, data extraction tool 612 may make calls to the computer aided design application to obtain and manipulate data about plies.

In these examples, standard computer aided design application programming interfaces are used to obtain the composite part in the document, the sequences in the part, the plies in a sequence, the surface that supports the ply, the geometry of the ply, the materials the ply is made of, and the orientation of the ply. Data extraction tool 612 identifies a three dimensional model containing the composite part within three dimensional model database 626 using location data 618.

Additionally, data extraction tool 612 extracts a set of sections from three dimensional model database 626 to generate output 628. The set of sections may be one or more sections, in these examples. The number of sections extracted may vary, depending on different implementations. These sections may be selected to contain and be around the location identified in location data 618. In the depicted examples, the set of sections is selected to be sufficient to provide enough information for performing the maintenance operation.

In these examples, a section is a cross-section of the composite part. The section is generated perpendicular to the surface of the part for some maximum allowable or selected length. For example, a section cut may be a cross-section that is up to 36 inches long. A section may be made or cut some number of set inches away from another section. The distances between sections may be, for example, 3 inches, 6 inches, or 9 inches. These sections are parallel to each other, in these examples.

Output 628 may be, for example, a drawing identifying the ply stacking sequence for the composite part. Further, output 628 also may include other information, such as orientation and materials for each ply. Output 628 also may include other information. For example, a three dimensional object for the part may be returned with an indication of identification of the location for each section for which ply lay-up data is present within output 628.

In other examples, a two dimensional drawing or grid may be returned with identifications of the sections with respect to the part in output 628. Output 628 is returned as ply lay-up data 630 to part application 608. Part application 608 may then display ply lay-up data 630 to the user for use in performing the maintenance operation on the composite part.

The three dimensional objects in part files database 616 are for example, without limitation, solid objects that provide sufficient detail for a user to select a location for which ply lay-up data 630 is needed. These three dimensional objects, however, do not include other data that may be sensitive or confidential to a manufacturer of the aircraft.

For example, details about other parts, their assembly, and architecture are not provided in these examples. For example, information about wiring, electronics, and assembly of substructures do not need to be provided for use in maintenance of composite parts. Additionally, this type of implementation allows a manufacturer to provide ply lay-up data in a faster manner as compared to having their own users locate and extract the data themselves. This type of architecture provides a quicker means for communication and avoids having the user manually measure and identify the coordinates on the aircraft.

As can be seen in this illustrative embodiment, ply lay-up data 630 may be supplied to a user to perform maintenance on an aircraft without needing manuals containing three dimensional drawings of the composite parts. Further, access to a three dimensional model also is unnecessary with this type of method and apparatus.

Part file generation tool 614, in these examples, may be implemented using any software that is capable of creating a three dimensional solid object for display from a three dimensional model, such as a computer aided design file for a particular part. For example, the Right Hemisphere® 5 platform is an example of a software product that may be used to create three dimensional object's part files in part files database 616. Right Hemisphere® 5 platform is a software product available from Right Hemisphere®. Further, part file generation tool 614 also may include processes to create code or scripts to display and receive identifications of location data 618.

Part application 608 or client 602 may display a part file from part files database 616 or user interface 610. Each part file allows a user to see and select a location on a part to generate location data 618.

In these examples, part files database 616 may be generated by part file generation tool 614 executing on server 606. Part file generation tool 614 may use data from three dimensional model database 626 to generate three dimensional objects for part files database 616.

The different components illustrated in maintenance environment 600 have been presented for purposes of depicting one or more advantageous embodiments. The particular organization of components is not meant to limit the manner in which different functions may be placed in different embodiments. For example, in some embodiments, server 604 and server 606 may be the same data processing system.

Figure 7:
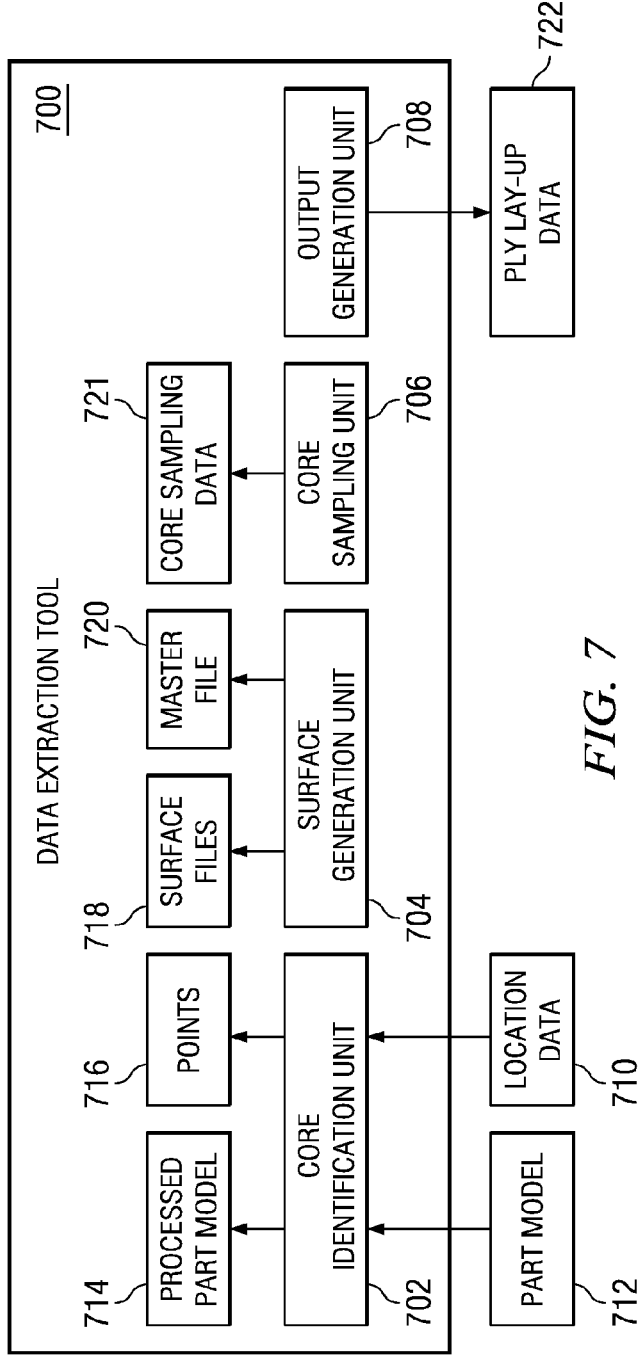
FIG. 7 is a diagram of a data extraction tool in accordance with an advantageous embodiment.

With reference now to FIG. 7, a diagram of a data extraction tool is depicted in accordance with an advantageous embodiment. In this example, data extraction tool 700 is an example of one implementation for data extraction tool 612 in FIG. 6. Data extraction tool 700 includes core identification unit 702, surface generation unit 704, core sampling unit 706, and output generation unit 708.

Core identification unit 702 receives location data 710 and part model 712. Core identification unit 702 creates an axis system including a damage axis in part model 712 at the damage location based on the location data. This damage axis is normal to the surface at the damage location in part model 712 and parallel to a rosette axis. Further, core identification unit 702 creates section cuts that intersect the surface and plies based on these section cuts and part model 712. Each section cut is a plane that intersects the surface of part model 712.

Core identification unit 702 may store this information as processed part model 714. Additionally, core identification unit 702 also may generate points 716. Points 716 are a file containing points where core sampling is to be performed. In these examples, the points are points along the section cuts. For example, for a section cuts, a number of points are selected on the surface for the section cut. Points 716 takes the form of an extensible markup language file, in these examples. Of course, these points may be saved in other types of data structures depending on the implementation.

Surface generation unit 704 creates surface files 718 based on processed part model 714. Master file 720 ties the different surfaces identified in surface files 718 together. In these examples, master file 720 contains a pointer to the surface file, including the path to its directory structure.

Master file 720 includes, for example, the part name, the sequence, the ply name, and other attributes. These attributes include, for example, a link to a surface file in surface files 718 containing the surface visualization data. The data is ordered in the master file according to the ply sequence in the part.

Each file within surface files 718 represents a portion of the surface of the part where sampling is to occur. Each file in surface files 718 includes, for example, without limitation, an identification of a point on the surface and other data used to identify and/or visualize the surface at that point. Core sampling unit 706 performs sampling using processed parts model 714, surface files 718, and master file 720. Core sampling unit 706 is used to perform the actual sampling. In these examples, core sampling unit 706 may be an OpenGL based application, program, and/or process. Of course, any type of application, program, and/or process that is capable of obtaining information about layers in a model may be used.

Core sampling unit 706 generates core sampling data 721. For example, master file 720 is used to identify a surface file from surface files 718 for processing or sampling. The identified surface file is used to perform sampling for the point identified by the surface file. This sampling generates data about different layers in a line below the sampling point in these illustrative examples. The line may be selected base on the damage axis that is identified.

In these examples, surface files 718 and master file 720 take the form of extensible markup language files. Core sampling data 721 also takes the form of an extensible markup language file, in these examples.

Core sampling data 721 includes core sample data. In other words, this data includes data obtained from sampling based on the identification of the core or section to be sampled in the part. Core sampling data 721 also includes, for example, an identification of plies that were pierced, data, and other suitable information.

Output generation unit 708 takes core sampling data 721 and generates ply lay-up data 722. Ply lay-up data 722 may be, for example, a file or other document containing ply lay-up information in a form that is suitable for presentation. In these examples, the format takes the form of a portable document format. This format may include text, images, two dimensional vector graphics, or other information. Of course, ply lay-up data 722 may be stored using other formats. Other formats may provide a capability to display or view data using three dimensional graphics.

Figure 8:
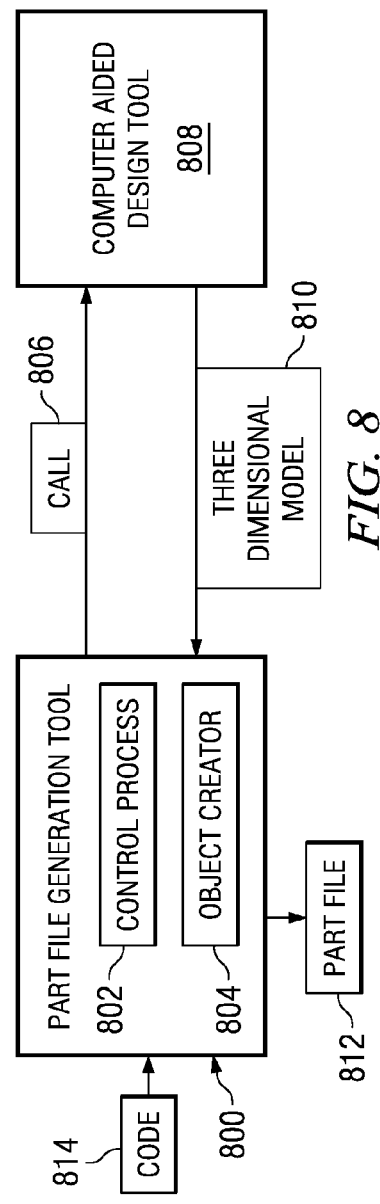
FIG. 8 is a block diagram illustrating components used to generate a part file in accordance with an advantageous embodiment.

Turning now to FIG. 8, a block diagram illustrating components used to generate a part file is depicted in accordance with an advantageous embodiment. In this example, part file generation tool 800 is an example of part file generation tool 614 in FIG. 6. As depicted, part file generation tool 800 includes control process 802 and object creator 804. Control process 802 may send call 806 to computer aided design tool 808 to retrieve three dimensional model 810. In these examples, computer aided design tool 806 may be, for example, CATIA V5R17.

Control process 802 uses object creator 804 to create a three dimensional object for part file 812. Additionally, control process 802 also adds code 814 to part file 812 to complete part file 812. Control process 802 may be used to ensure that the transfer of three dimensional model 810 from computer aided design tool 808 is performed in a secure manner.

Turning now to FIG. 9, a diagram illustrating a part file is depicted in accordance with an advantageous embodiment. In this example, part file 900 includes three dimensional object 902 and code 904. Code 904 provides processes for receiving user input to identify a location on three dimensional object 902. Further, code 904 may include processes to send the location information to another process, such as part application 608 or data extraction tool 612 in FIG. 6.

In these examples, code 904 allows a user to select a location on three dimensional object 902. In these examples, code 904 takes the form of JavaScript®. JavaScript® is a scripting language typically used for client side web development. Of course, code 904 may be implemented using any type of language suitable for the particular implementation. JavaScript® is a registered trademark of Sun Microsystems, Inc.

The selection of this location may be translated into three dimensional coordinates, such as X, Y, and Z coordinates. Three dimensional object 902, in these examples, is a solid representation of the particular part. Three dimensional object 902 only provides a visual view of the part and does not include other information that may be found within a three dimensional model. In this manner, part file 900 may be smaller in size. The user may perform various manipulations of three dimensional object 902. These manipulations include rotate, zoom, measure, and change lighting.

When a user has confirmed the selection of the particular location on three dimensional object 902, the three dimensional location information is then transmitted to a part application, such as part application 608 in FIG. 6. In turn, the part tool may send the location data to a data extraction tool, such as data extraction tool 612 in FIG. 6. In other implementations, code 904 may directly send the location data to the data extraction tool.

In these examples, part file 900 may be implemented using a number of different types of files. For example, part file 900 may be, for example, a three dimensional PDF document. Further, other types of files may be created to contain three dimensional object 902. For example, three dimensional object 902 may be included in a word processing document generated using Word 2007 which is a product of Microsoft Corporation.

With reference now to FIG. 10, a diagram illustrating ply layout data is depicted in accordance with an advantageous embodiment. In this example, ply layout data file 1000 is an example of a file containing ply layout data for a particular part. Ply layout data file 1000 is an example of output 628 in FIG. 6. This data file may be transmitted as ply lay-up data 630 in FIG. 6.

Ply layout data file 1000 includes, in these examples, two dimensional ply stacking sequence drawing 1002, orientation information 1004, materials information 1006, and grid 1008.

In the different advantageous embodiments, two dimensional ply stacking sequence drawing 1002 is a two dimensional drawing identifying the stacking sequence for the particular section of the part selected by the user. Although the ply stacking sequence is presented as a two dimensional drawing in these examples, other embodiments may provide the ply stacking sequence information in different forms. For example, a table may be presented to identify the sequence of plies within the composite part.

Orientation information 1004 identifies the orientation of each ply within the stacking sequence. Materials information 1006 identified the type of material for each ply within the stacking sequence. Grid 1008, in these examples, provides a two dimensional diagram of the composite part in which the different sections are associated with the set of sections containing ply lay-up data.

In this example, ply layout data file 1000 contains a single section around the location selected by the user. In other advantageous embodiments, ply layout data file 1000 may include sections for other areas of the part in addition to the location selected by the user. Of course, ply layout data file 1000 may include other information in addition to or in place of information illustrated in these examples.

For example, ply layout data file 1000 also may include a three dimensional object identifying the location for which the ply layout data is provided. This three dimensional object may be the same three dimensional object used by the operator to select a location for which ply lay-up data is desired. The three dimensional object may be in addition to or in place of grid 1008, depending on the particular implementation.

Figures 11, 12:
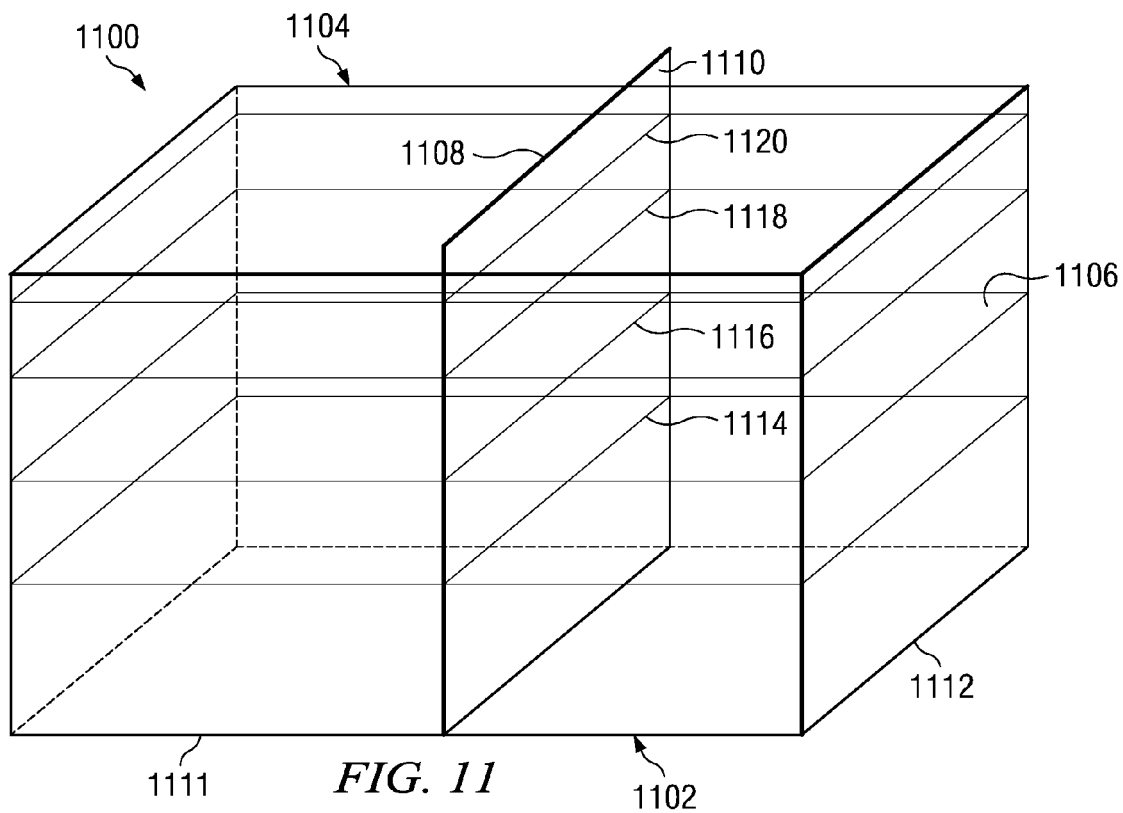
FIG. 11 is a diagram illustrating a portion of a part in accordance with an advantageous embodiment.
FIG. 12 is a diagram illustrating a user interface for searching for lay-up data for composite parts in accordance with an advantageous embodiment.

With reference now to FIG. 11, a diagram illustrating a portion of a part is depicted in accordance with an advantageous embodiment. In this example, part 1100 may be a part found in part files database 616 in FIG. 6.

In this illustrative example, part 1100 has base surface 1102 and top surface 1104. Plies 1106 may be found between top surface 1104 and base surface 1102. In this illustrative example, plane 1108 intersects part 1100. In this example, the intersection may be substantially normal to top surface 1104 at line 1110. Plane 1108 is a virtual mathematical plane used as a boundary to form the intersection with part 1100 to identify ply data.

This planar intersection by plane 1108 may be performed using data extraction tool 612 in FIG. 6. In these examples, coordinates U and V may define the planar intersection with plies 1106 in part 1100. As shown in this illustrated example, part 1100 has U axis 1111 and V axis 1112. These axes are relative to plane 1108. Plane 1108 is used as a boundary with the coordinates defining the plane intersecting each ply within plies 1106 within part 1100.

The intersection with each ply in plies 1106 results in a line such as, for example, lines 1114, 1116, 1118, and 1120. In this illustrative example, each line represents a top portion of a ply intersected by plane 1108. Of course, other lines may be present depending on the number of plies present in the intersection of plane 1108 in part 1100. These lines may be described using UV coordinates that are relative to plane 1108. Further, the intersection represented by the lines may be given a linear approximation using XYZ coordinates. In other words, the UV coordinates for plane 1108 may be translated into XYZ coordinates, or some other coordinate system.

Based on this information, ply data may be obtained for each line within plane 1108. Each line may be placed on top of the next line starting from base surface 1102 all the way up through top surface 1104. This data may be used to generate a presentation of ply layup data for part 1100.

Turning now to FIG. 12, a diagram of a user interface for searching for lay-up data for composite parts is depicted in accordance with an advantageous embodiment. In this example, window 1200 provides a user interface for composite parts. Window 1200 is an example of a user interface, such as user interface 610 in FIG. 6.

In these examples, window 1200 contains fields 1202, 1204, 1206, 1208 and 1210. Field 1202 allows a user to select a model for the particular aircraft. Field 1204 allows a user to enter a part number for the composite part of interest. Field 1206 allows the user to enter a customer code to identify a specific customer. The code is a three digit alpha numeric code that identifies a customer. A part name may be entered in field 1208. This part name is an identifier of the part, such as a fastener, rib, or wing panel. A product may be entered in field 1210. Field 1210 allows the user to enter a product.

Window 1200 also includes fields 1212, 1214, and 1216. Field 1212 allows a user to select an aircraft identification type. Fields 1214 and 1216 allow a user to select from different airplanes of the particular type. The airplane identification type offers a choice of methods by which a specific airplane can be identified. Fields 1214 and 1216 then allow a user to enter the airplane identification for the specific airplane(s), such as, for example, the line number for the actual airplane that requires repair.

When the user has entered information for the search, the user may begin the search for the part file by selected control 1218. If the user wishes to re-enter or change some information, the user may select control 1220.

Turning now to FIG. 13, a diagram illustrating a user interface for searching for composite parts is depicted in accordance with an advantageous embodiment. In this example, window 1200 is shown as presenting examples of results from a search for composite parts. As depicted, entries 1300, 1302, 1304, and 1306 are examples of results returned from a search for a composite part. Each entry includes a part number, part name, revision identification, and status.

Further, each entry also allows a user to select a part for presentation. This selection may be made through icons 1308, 1310, 1312, and 1314. Selection of one of these icons initiates the display of a part file, such as part file 900 in FIG. 9. Alternatively, a user may manually submit a request for a section by selecting links 1316, 1318, 1320, or 1322. Selection of these links allows a user to manually enter location information for a particular part. In some embodiments, a user may desire to manually enter the location information if measurements of the actual part have been made.

Figure 14:
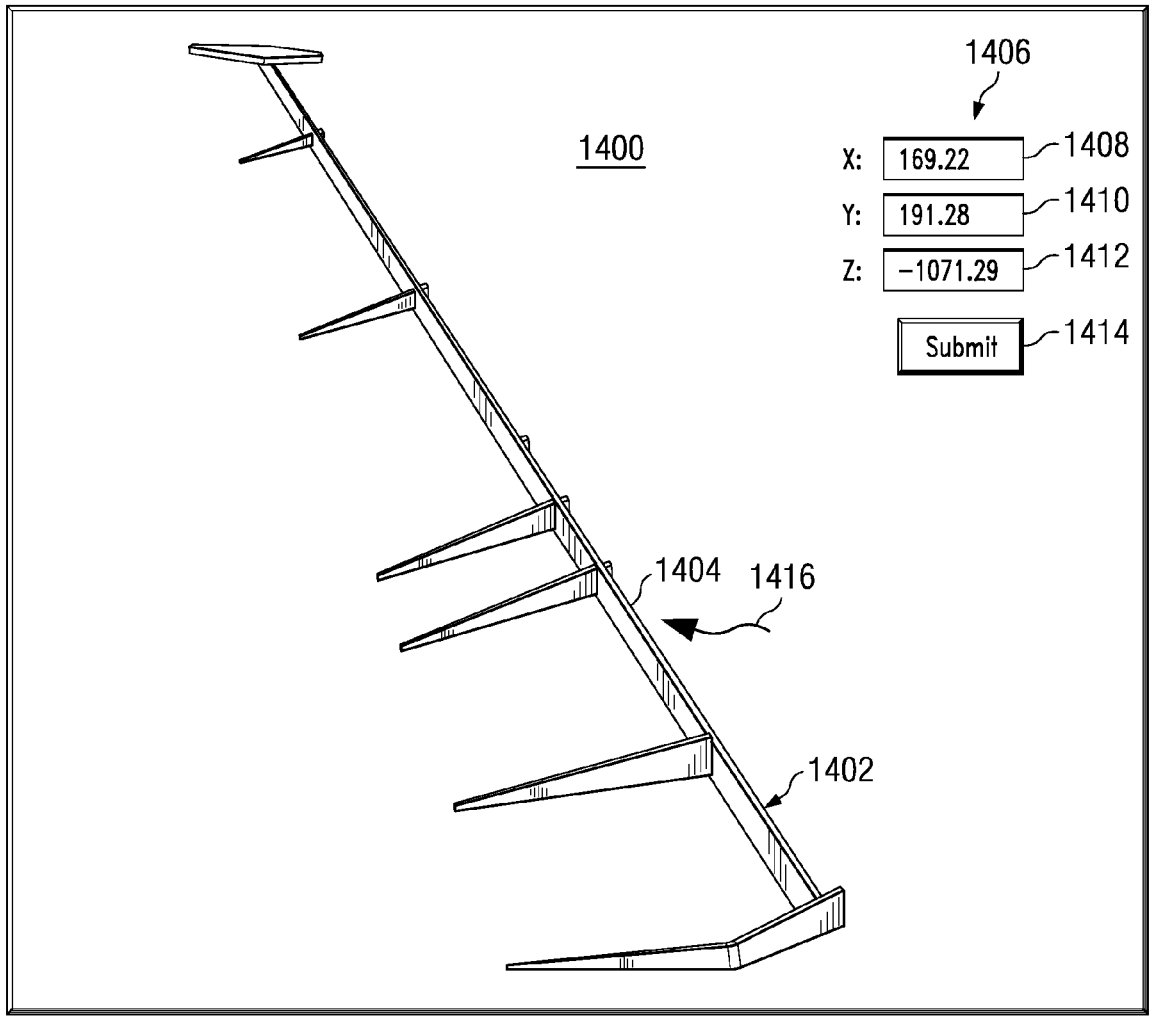
FIG. 14 is a diagram illustrating a display of a part file in accordance with an advantageous embodiment.

Turning now to FIG. 14, a diagram illustrating a display of a part file is depicted in accordance with an advantageous embodiment. Display 1400 is an example of a display that may be presented within user interface 610 in FIG. 6. Display 1400 is an example of a part file that is displayed to obtain user input identifying a location on a composite part. In this example, display 1400 includes three dimensional object 1402, which is a solid three dimensional object from which a user may select a location on three dimensional object 1402 to obtain location information.

As depicted, three dimensional object 1402 is a solid representation of the composite part. Although a solid model is present in these examples, other types of representations may be used. For example, a surface model may be used. Other information that may be contained in a three dimensional model other than the graphical presentation of the part may be left out of the part file. In this manner, trade secret, confidential, or export controlled information may be maintained due to this type of distribution of information.

When the user selects a point on three dimensional object 1402, such as point 1404, window 1400 displays three dimensional coordinate information data 1406. In this example, this coordinate information includes X coordinate 1408, Y coordinate 1410, and Z coordinate 1412. As the user selects different points on three dimensional object 1402, three dimensional coordinate information 1406 displayed in window 1400 changes to indicate the selected location. In these examples, the selection may be made by moving a pointer, such as pointer 1416 to a desired location on three dimensional object 1402 and initiating a command. This command may be, for example, without limitation, a right-click of a mouse button or the pressing of a function key.

When the user has selected a particular point on which ply layout data is desired, the user may select control 1414 to send three dimensional coordinate information data 1406 to a server for processing. In these examples, three dimensional coordinate information data 1406 may be sent to part application 608 in FIG. 6, which in turns sends the information as location data 618 to data extraction tool 612 in FIG. 6. In other embodiments, location data 618 may be sent directly to data extraction tool 612 in FIG. 6.

Figure 15:
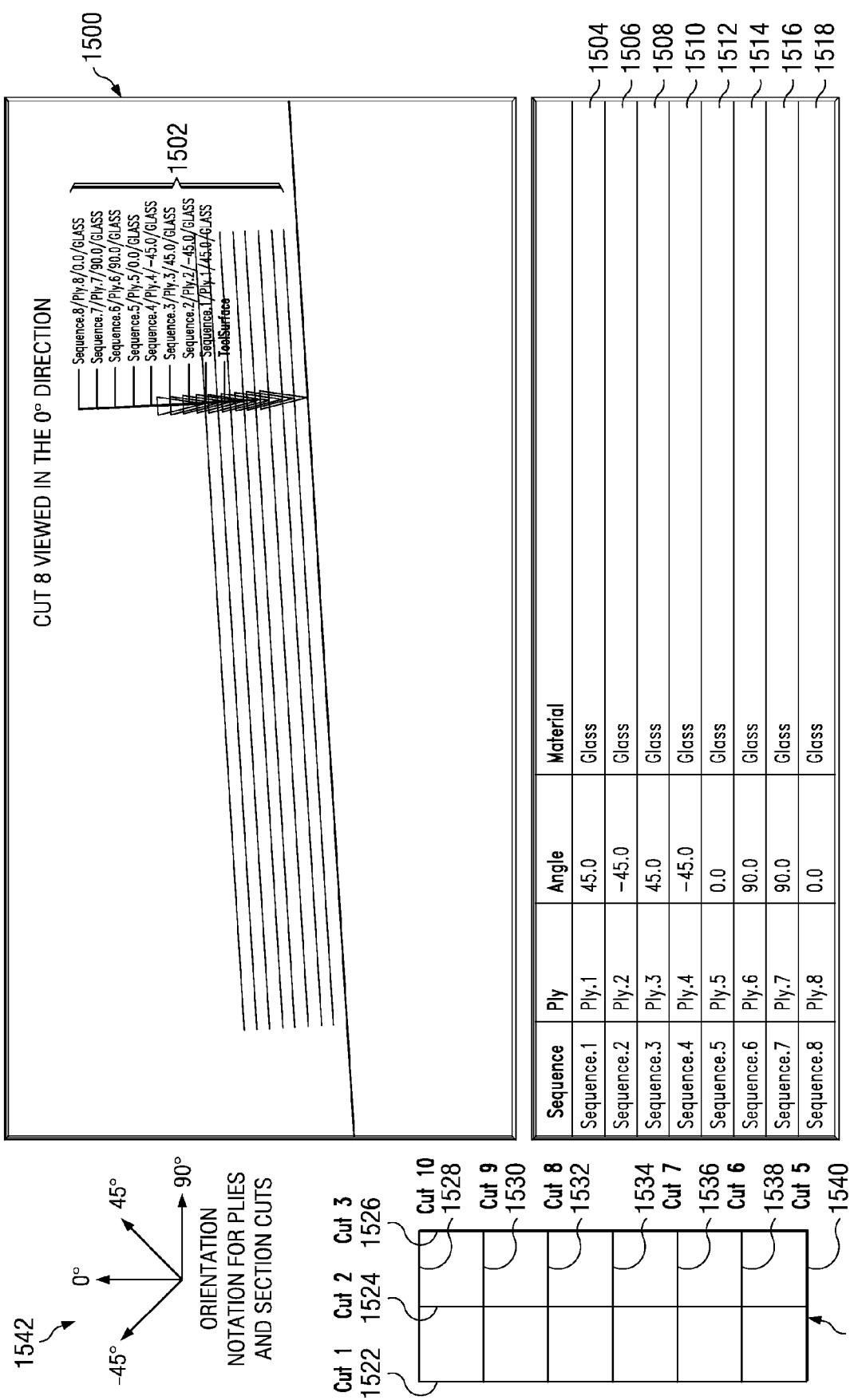
FIG. 15 is a diagram illustrating ply lay-up data returned in response to sending location data in accordance with an advantageous embodiment.

With reference next to FIG. 15, a diagram illustrating ply lay-up data returned in response to sending location data is depicted in accordance with an advantageous embodiment. Display 1500 is an example of a display that may be presented through user interface 610 in FIG. 6. In this example, display 1500 presents ply lay-up data extracted from a three dimensional model in response to receiving location data about a particular part.

In this example, section 1502 in display 1500 shows a stacking sequence for eight plies. The identification of the sequence, the ply number, the orientation, and the material are shown in entries 1504, 1506, 1508, 1510, 1512, 1514, 1516, and 1518. These entries correspond to the display in section 1502. Entries 1504, 1506, 1508, 1510, 1512, 1514, 1516, and 1518 are for a particular section within the part.

The location of section 1502 may be identified through grid 1520. As described above, grid 1520 may be a three dimensional drawing of a top surface of the part with grid markings to associate section 1502 with the appropriate place on the part. In this particular example, grid 1520 includes sections 1522, 1524, 1526, 1528, 1530, 1532, 1534, 1536, 1538, and 1540. Each of these sections represents a section or cross-section of the composite part. These sections may also be referred to as cuts.

In these examples, the orientation of section 1502 and plies 1504, 1506, 1508, 1510, 1512, 1514, 1516, and 1518 is made relative to the part. An example, without limitation, is shown using reference axis 1542 is an axis system used to relate this ply lay-up data to grid 1520.

In this example, the display of information is for section 1532. Section 1532 is identified as being associated with section 1502 through a graphical indicator to identify the location on the part for which ply lay-up data is displayed.

Each of these sections may be, for example, 9 inches, 6 inches, or 3 inches apart. The length of these sections may vary, depending on a selection by the user or a default value in these examples. Grid 1520 covers an entire part, in these examples. In this particular illustrative example, information for section 1502 is displayed. Reference axis 1542 may be included in the output file to show the orientation relationship of section 1502 and plies 1504, 1506, 1508, 1510, 1512, 1514, 1516, and 1518 relative to grid 1520.

In other embodiments, additional sections may be present in the lay-up data. These additional sections in the set of sections may be presented in the same manner as illustrated in display 1500. The different sections may be associated with other entries within grid 1520.

Figure 16:
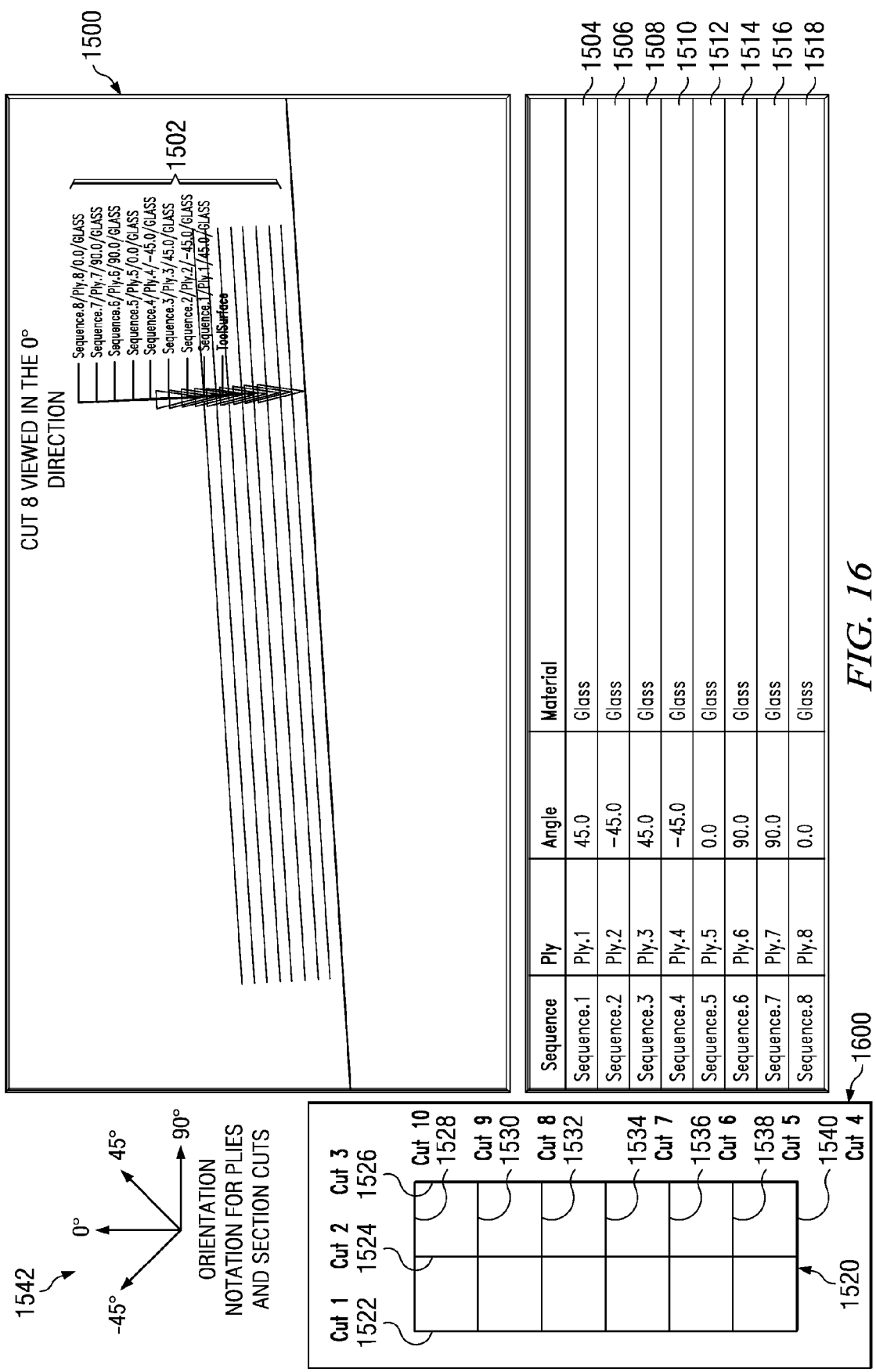
FIG. 16 is another example of a diagram illustrating ply lay-up data returned in response to sending location data in accordance with an advantageous embodiment.

With reference now to FIG. 16, another example of a diagram illustrating ply lay-up data returned in response to sending location data is depicted in accordance with an advantageous embodiment. In this example, drawing 1600 presents ply lay-up data extracted from a three dimensional model in response to receiving location data by the particular part. Drawing 1600 is similar to display 1500 in FIG. 15.

In this advantageous embodiment, drawing 1600 also provides a drawing of the part. As can be seen, in this example, grid 1520 is overlaid or displayed on drawing 1600. Drawing 1600 is a two dimensional drawing of the part in this illustrative example. In other advantageous embodiments, drawing 1600 may take the form of a three dimensional drawing. If drawing 1600 takes the form of a three dimensional display that may be manipulated, manipulation or movement of drawing 1600 also results in grid 1520 moving in the same fashion because of the association of grid 1520 with drawing 1600.

Figure 17:
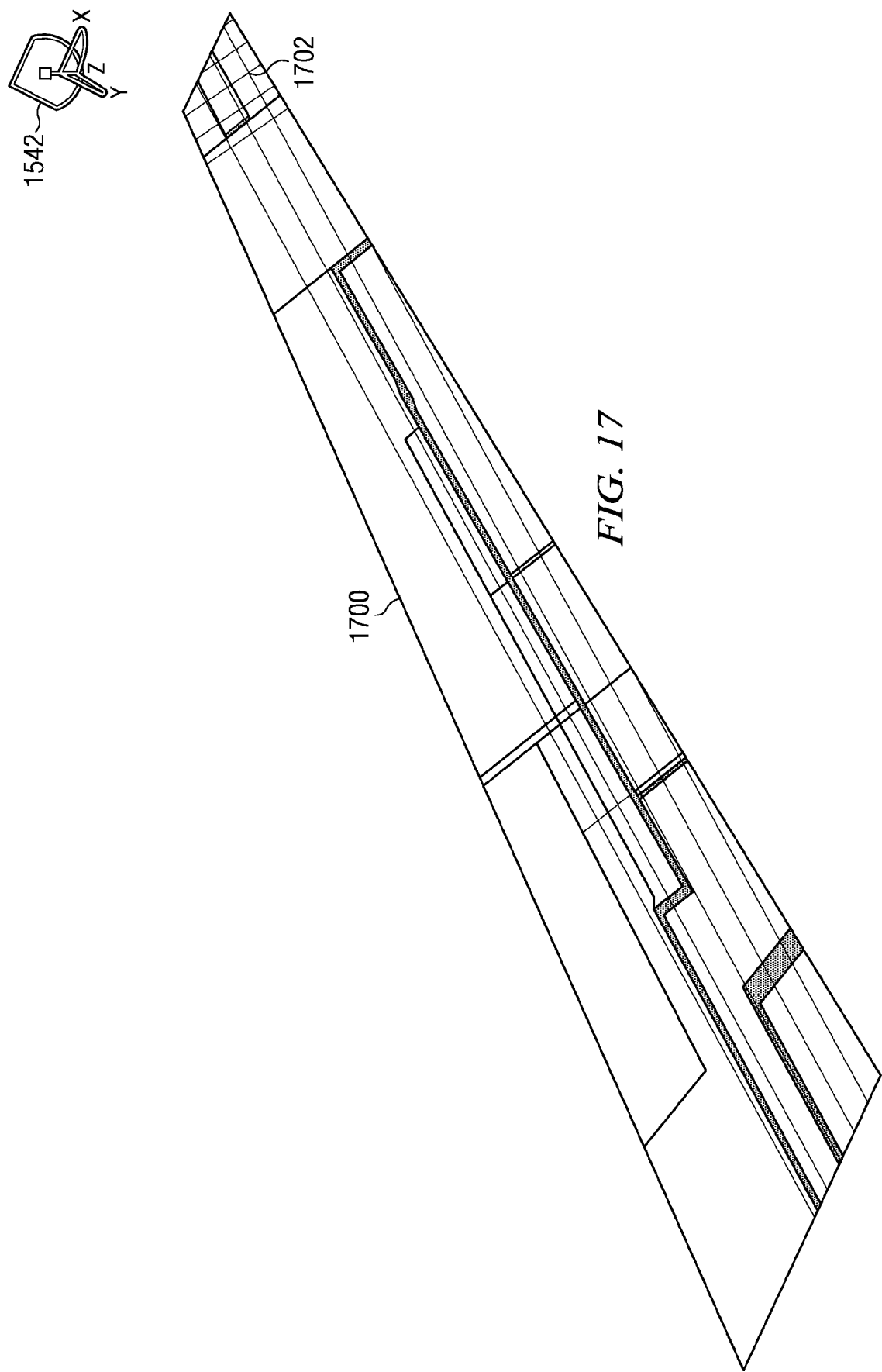
FIG. 17 is a diagram illustrating an example of a three dimensional drawing in association with a grid identifying ply lay-up data in accordance with an advantageous embodiment.

With reference now to FIG. 17, a diagram illustrating an example of a three dimensional drawing in association with a grid identifying ply lay-up data is depicted in accordance with an advantageous embodiment. In this example, drawing 1700 is a three dimensional drawing of a wing with grid 1702 displayed or overlaid on drawing 1700. In this example, reference axis 1542 provides reference information to the orientation of drawing 1700 in grid 1702. In this illustrative example, other drawing information such as, for example, stacking sequences, ply number, orientation, and material also may be displayed in association with drawing 1700 in grid 1702. This information may be displayed on the same display or a separate display depending on the particular implementation.

Figure 18:
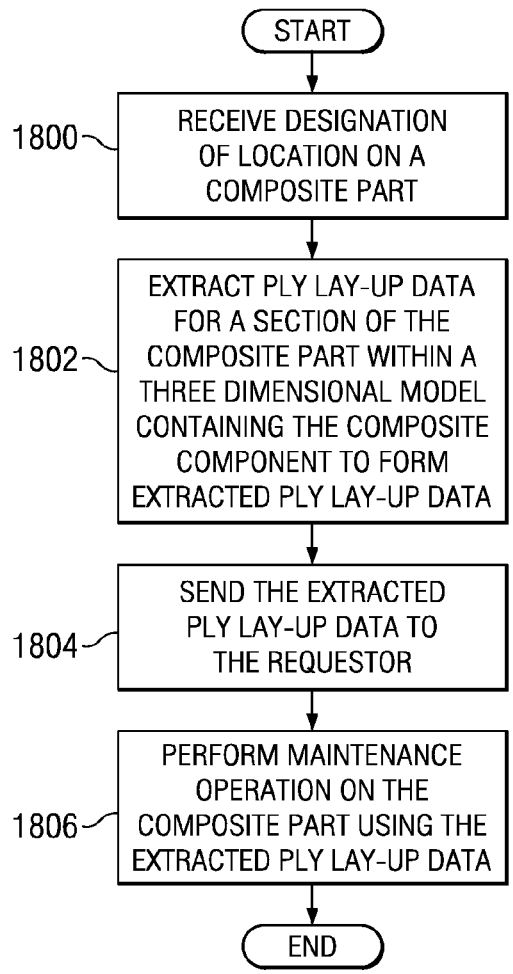
FIG. 18 is a flowchart of a process for generating ply lay-up data in accordance with an advantageous embodiment.

Turning now to FIG. 18, a flowchart of a process for generating ply lay-up data is depicted in accordance with an advantageous embodiment. The process illustrated in FIG. 18 may be implemented in a software component, such as data extraction tool 612 in FIG. 6, in these examples.

The process begins by receiving a designation of the location on a composite part (operation 1800). In these examples, the designation of the location may be received as location data 618 in FIG. 6. Further, the designation also may include an identification of the part for which ply lay-up data is desired. The process then extracts the ply lay-up data for a section of the composite part within a three dimensional model containing the composite part to form extracted ply lay-up data (operation 1802).

Of course, depending on the particular implementation, more than one section may be extracted in operation 1802. Additionally, in other embodiments, the section extracted in operation 1802 may be sub-divided into a set of sections or sub-sections. Thereafter, the extracted ply lay-up data is sent to the requester (operation 1804). The process then performs the maintenance operation on the composite part using the extracted ply lay-up data (operation 1806). The process terminates thereafter.

Figure 19:
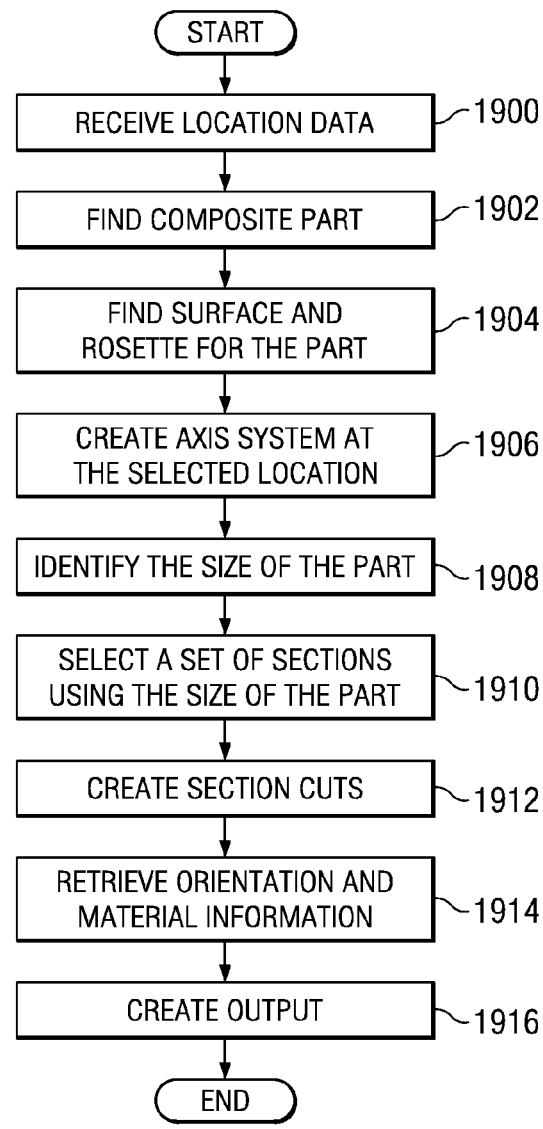
FIG. 19 is a flowchart of a process for generating a section cut in accordance with an advantageous embodiment.

With reference now to FIG. 19, a flowchart of a process for generating a section cut is depicted in accordance with an advantageous embodiment. The process in FIG. 19 is a more detailed explanation of operation 1802 in FIG. 18.

The process begins by receiving the location data (operation 1900). The process finds the composite part (operation 1902). In these examples, the composite part may be identified from the part application that may be received from the location information. The process then finds the surface and rosette for the part (operation 1904). A rosette is an axis system in which the ply orientations are defined, on the Z=0 plane relative to the X axis. Reference axis 1542 in FIG. 15 is an example of a rosette.

Next, the process creates an axis system at the selected location (operation 1906). The selected location is identified from the coordinate information received in the location data. In these examples, the axis system has a Z vector normal to the surface of the composite part. The axis system has an X vector that is parallel to the x-axis of the rosette.

The process identifies the size of the part (operation 1908). The process then selects a set of sections using the size of the part (operation 1910). In identifying or selecting the set of sections, a number of sections and the location of the sections may be selected. Default or maximum sizes for the sections may be identified. For example, the area to be cut may be no more than 18 inches on either side of the X=0 and Y=0 planes. The set of sections may be, for example, a set of subsections for a section around the location selected by the user. For example, the set of sections may be subdivided from a section that is 0.5 yards to the right and left of the location and 0.5 yards above and below the location.

The process then creates section cuts (operation 1912). Operation 1912 is used to identify the ply stacking sequence, in these examples. In generating section cuts, the process generates the section cuts along the x-axis first, then along the y-axis.

Additionally, the process retrieves orientation and material information for the sections (operation 1914). The process then creates the output file (operation 1916), with the process terminating thereafter. In these examples, the output file includes the section cuts as well as the orientation and material data. Further, a grid may be present to identify the location of each section.

Figure 20:
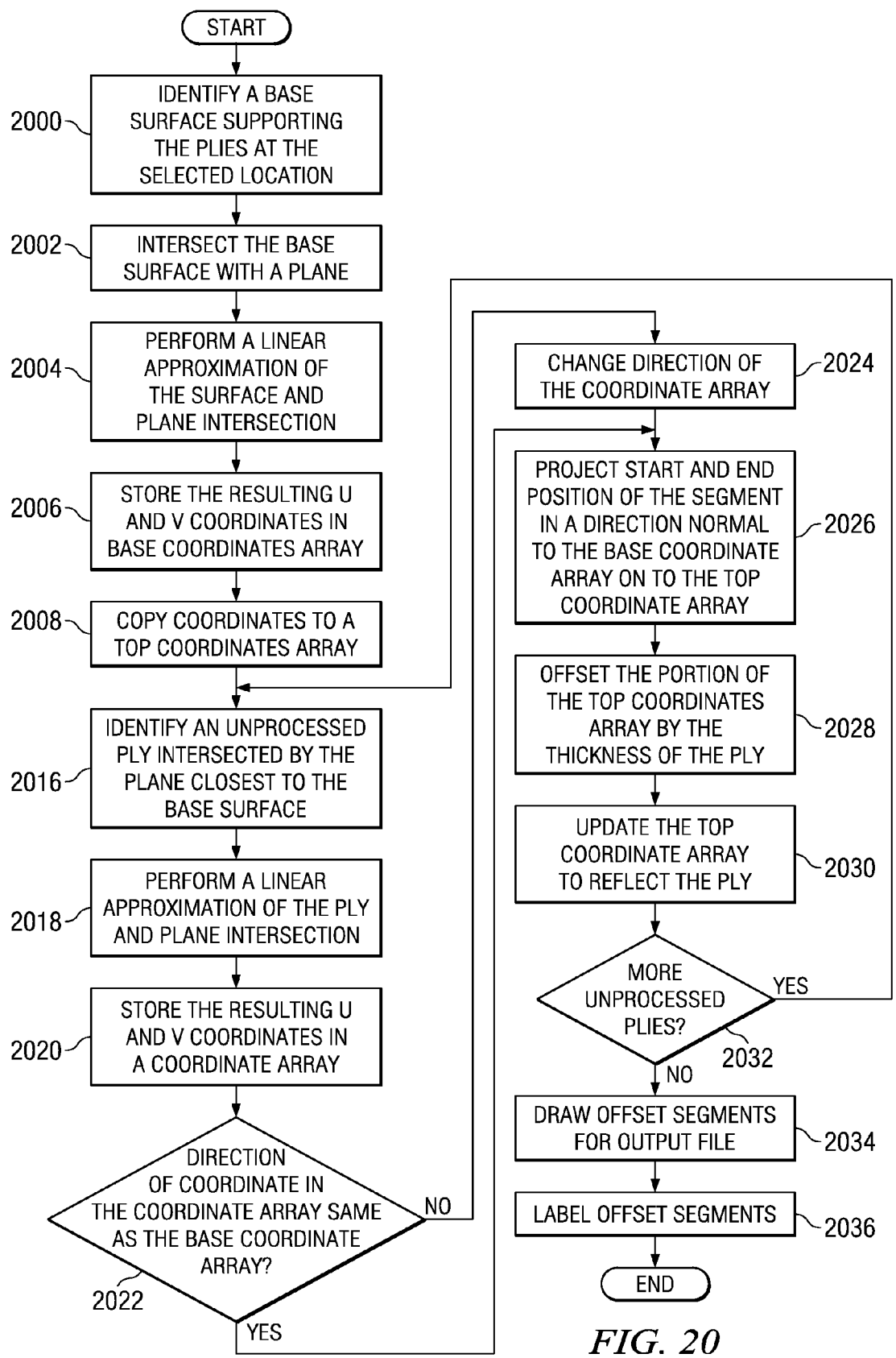
FIG. 20 is a flowchart of a process for creating section cuts in accordance with an advantageous embodiment.

Turning now to FIG. 20, a flowchart of a process for creating section cuts is depicted in accordance with an advantageous embodiment. The process illustrated in FIG. 20 is a more detailed description of operation 1912 in FIG. 19. The process in FIG. 20 may be implemented in a software component such as, for example, data extraction tool 700 in FIG. 7. The process in FIG. 20 is an example of a process that may be used to generate ply layup data as described with respect to FIG. 1100 in FIG. 11.

The process begins by identifying a base surface supporting the plies at the selected location (operation 2000). Next, the base surface is intersected with a plane (operation 2002). A linear approximation of the surface and a plane intersection is performed (operation 2004).

The resulting U and V coordinates are stored in a base coordinates array (operation 2006). The process generates intersections between the plane and the ply. A linear approximation of the resulting intersection is performed. The result is a series of points with x, y, and z coordinates. The points are all on the plane, which has its own u, v coordinate system. The values that are stored are the u and v coordinates of the point on the plane, relative to the plane origin.

These coordinates are copied into a top coordinates array (operation 2008). At this point, the base coordinates array and the top coordinates array have the same values. As processing of the different plies in the section occur, the top coordinates array is updated. The final resulting values for the top coordinates array is the top surface of the upper most ply in the section.

Thereafter, an unprocessed ply intersected by the plane closest to the base surface is identified (operation 2016). A linear approximation of the ply and plane intersection is performed (operation 2018). The resulting U and V coordinates are stored in a coordinate array (operation 2020).

Next, a determination is made as to whether the direction of the coordinates in the coordinate array is the same as the direction of the coordinates in the base coordinate array (operation 2022). If the coordinates are not in the same direction in the two arrays, the direction of the values for the coordinates in the coordinate array are reversed to match the same direction as the base coordinate array (operation 2024).

When the ply/plane intersection is performed, the result is one or more curves. These curves have inherent start and end points used by the process. The process projects the start and end points of the segment in a direction normal to the base coordinate array onto the top coordinate array (operation 2026). The process proceeds directly to this operation from operation 2022 if the direction of the coordinate array and the base coordinate array are the same.

The process offsets the portion of the top coordinates array between the segment end points by the thickness of the ply (operation 2028). Operation 2028 changes the values in the top coordinate array to reflect the top of the ply that is being processed. The offset represents the plies actual position in space. The process then updates the top coordinate array to reflect the top of the ply (operation 2030).

The end points of the ply/plane intersection curve are projected onto the line segments defined in the top coordinate array, defining the bottom of the ply. The segments between the endpoints are offset by the scaled thickness, defining the top of the ply. Next, a determination is made as to whether additional unprocessed plies are present (operation 2032). If additional plies are present, the process returns to operation 2016 as described above to select another ply for processing.

If additional unprocessed plies are not present, the process then draws or creates the offset segments for each of the plies for the output (operation 2034). These offset segments for the plies are used in a two dimensional drawing to identify the ply stacking sequence. The process labels the segments so that each segment may be identified (operation 2036), with the process terminating thereafter.

In these examples, operations 2000-2026 may be implemented in a unit such as, for example, core identification unit 702 within data extraction tool 700 in FIG. 7. Operations 2028 and 2030 may be implemented in a unit such as, for example, core sampling unit 706 in FIG. 7. Operations 2034 and 2036 may be implemented in a unit, such as output generation unit 708 in FIG. 7.

In these examples, the planes are created perpendicular to the X vector and the Y vector. These planes may have various spacing. For example, the X planes may range from X=−18 to X=+18, and the Y planes may range from Y=−18 to Y=+18, with respect to the damage location. The range of the planes may be smaller if the part does not extend as far as the plane for the selected value. With the selected plane, a number of cuts are created. These different cuts are based on the length and width of the part. The cuts, however, in these examples, have a default value that is not less than 3 inches. The actual spacing may be adjusted such that all of the cuts are the same distance apart. Of course, other default values may be used, depending on the particular implementation.

As an example, if the damage location is 16 inches from the edge of the part, the range of the cuts in the X direction would be from −16 to +18 for a total of 34 inches. If the spacing is specified as 6 inches, it is adjusted to 5.667, so the cuts are taken at the following X values: −16, −10.333, −4.667, 1, 6.667, 12.333, and 18. As another example, if the part is 14 inches wide, the damage is in the center of the part, and a spacing of 3 inches is requested, the spacing may adjusted to provide cuts that are 2.8 inches apart. These cuts may be at X values as follows: −7, −4.2, −1.4, 1.4, 4.2, and 7.

Figure 21:
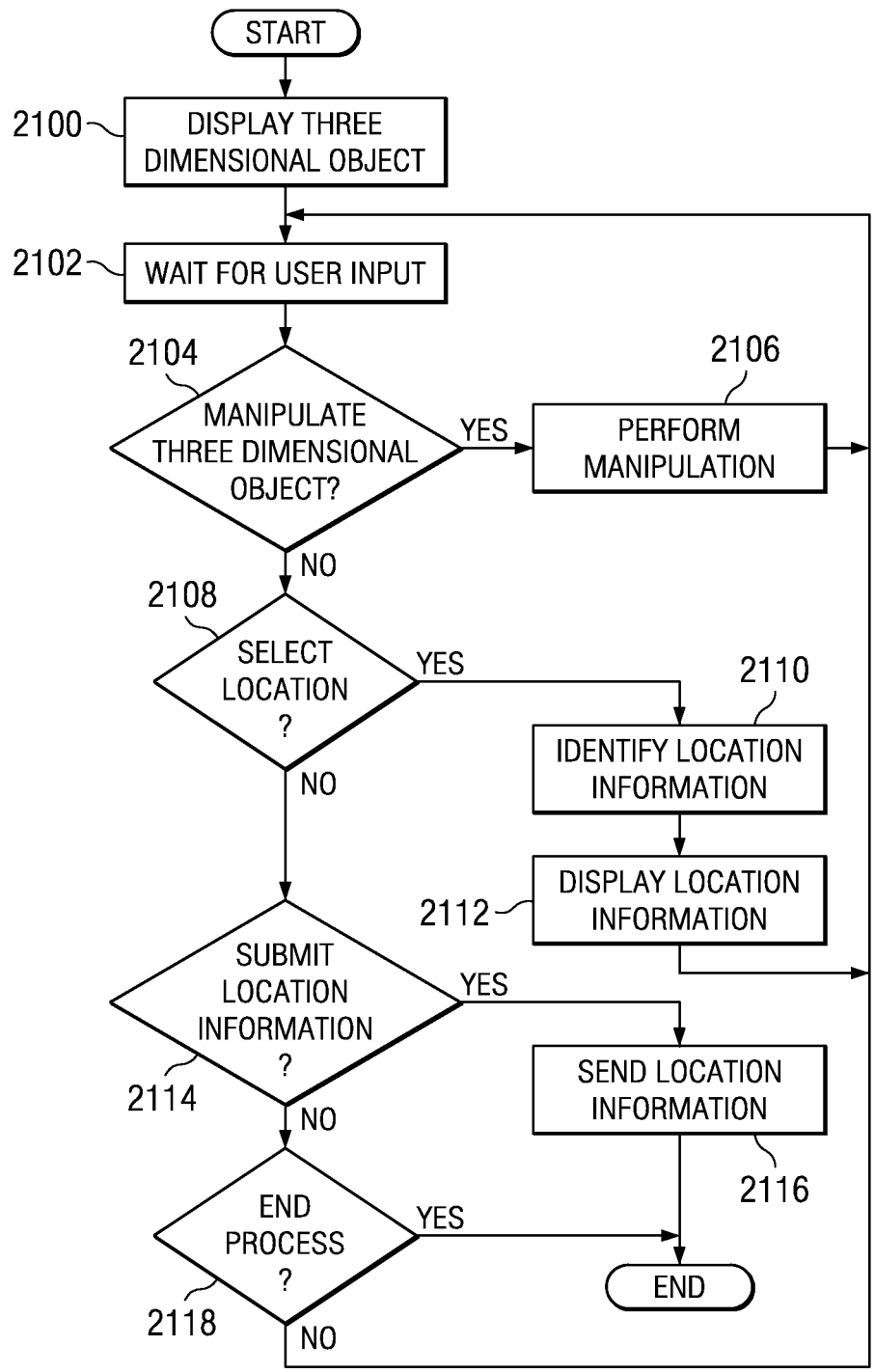
FIG. 21 is a flowchart of a process for selecting a location on a part in accordance with an advantageous embodiment.

Turning now to FIG. 21, a flowchart of a process for selecting a location on a part is depicted in accordance with an advantageous embodiment. The process illustrated in FIG. 21 may be implemented in a software component, such as code 904 in part file 900 in FIG. 9.

The process begins by displaying the three dimensional object in the part file (operation 2100). The process then waits for a user input (operation 2102). This user input may take various forms, such as, for example, without limitation, manipulating the three dimensional object, selecting a location on the three dimensional object, and submitting the location information to obtain ply lay-up data.

A determination is made as to whether the user input is to manipulate the three dimensional object (operation 2104). If the user input is to manipulate the three dimensional object, the selected manipulation is performed (operation 2106), with the process then returning to operation 2102. In operation 2106, the user may perform various actions, such as, for example, rotate the object, zoom, or pan.

If in operation 2104 the user input is not to manipulate the three dimensional object, a determination is made as to whether the user input selects a location on the three dimensional object (operation 2108). If the user input selects a location, the location identification is identified based on the user selection (operation 2110). The location information is displayed (operation 2112), with the process then returning to operation 2102 as described above. This location information may be, for example, in the form of X, Y, and Z coordinates.

With reference again to operation 2108, if the user does not select a location, a determination is made as to whether the user is to submit location information (operation 2114). If the user is to submit the location information, the process sends the location information (operation 2116), with the process terminating thereafter. In these examples, the location information may be sent to another application, such as, for example, part application 608 or data extraction tool 612 in FIG. 6.

Turning back to operation 2114, if the user input is not a submission of the location information, a determination is made as to whether the user has decided to end the process (operation 2118). If the user has decided to end the process, the process terminates. Otherwise, the process returns to operation 2102 to wait for additional user input. In this instance, the user input is some input not handled by the process illustrated in this figure.

Figure 22:
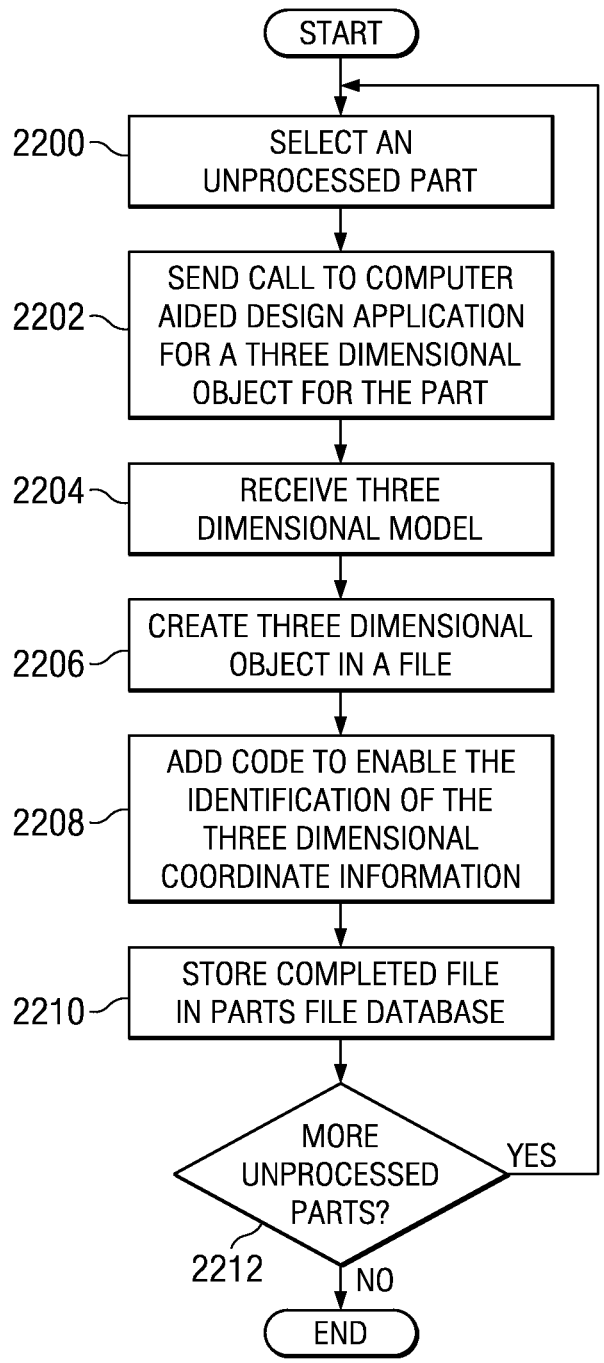
FIG. 22 is a flowchart for creating part files in accordance with an advantageous embodiment.

Turning now to FIG. 22, a flowchart for creating part files is depicted in accordance with an advantageous embodiment. The process illustrated in FIG. 22 may be implemented in a software component, such as part file generation tool 614 in FIG. 6 to make part files for part files database 616 in FIG. 6. An example of a part file is part file 900 in FIG. 9.

The process begins by selecting an unprocessed part (operation 2200). Thereafter, the process sends a call to the computer aided design application for a three dimensional object for the part (operation 2202). This call may be made through various application program interface calls that are available on many computer aided design programs. In these examples, the computer aided design program may be CATIA V5R17. The process then receives a three dimensional model in response to the call (operation 2204).

The process creates a three dimensional object in a file from the three dimensional model (operation 2206). Operation 2206 creates a three dimensional object without additional data that may be present in the three dimensional model. Operation 2206 may be performed using a software program such as, for example, the Right Hemisphere 5 platform.

Thereafter, code is added to the file to enable identification of three dimensional coordinate information (operation 2208). Operation 2208 may add a code, such as code 904 in FIG. 9. Thereafter, the completed file is stored in a parts file database (operation 2210). The process then determines whether additional unprocessed parts are present (operation 2212). If additional unprocessed parts are present, the process returns to operation 2200 to select another unprocessed part; otherwise, the process terminates.

Figure 23:
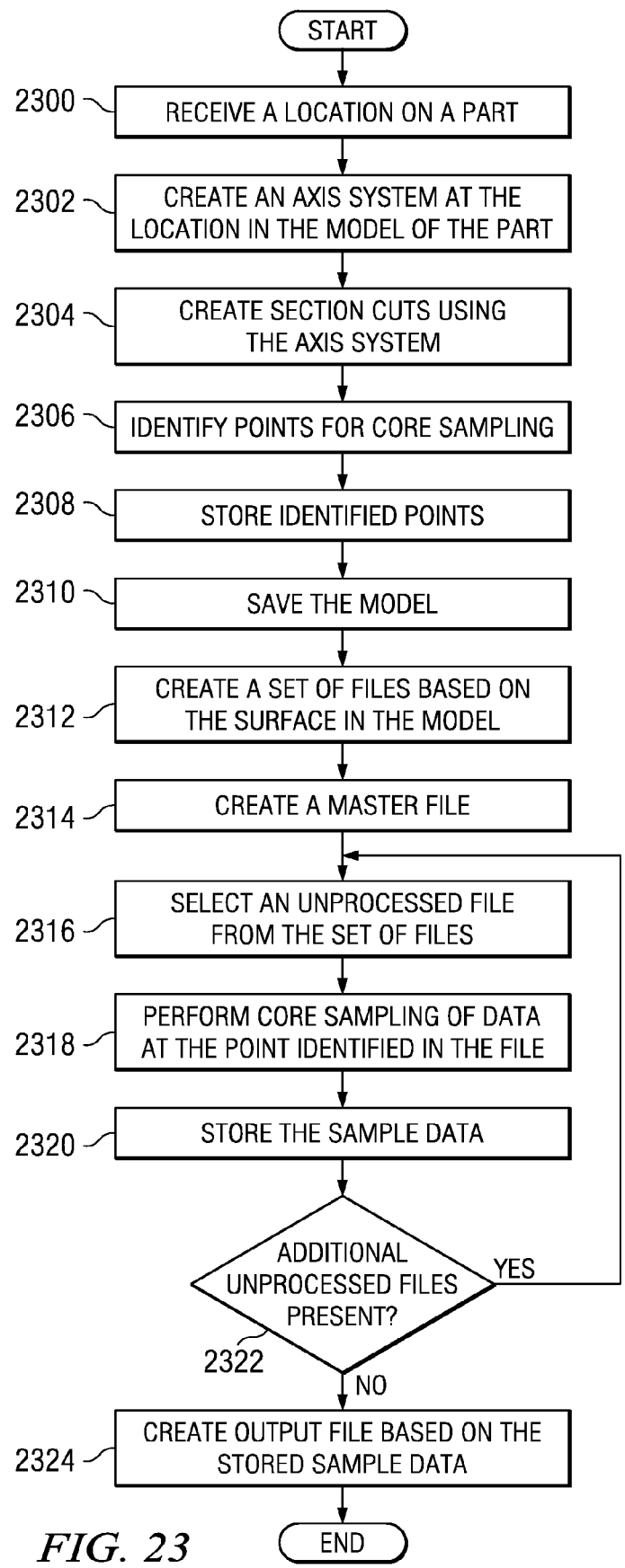
FIG. 23 is a flowchart of a process for creating ply lay-up data in accordance with an advantageous embodiment.

With reference now to FIG. 23, a flowchart of a process for creating ply lay-up data is depicted in accordance with an advantageous embodiment. The process illustrated in FIG. 23 may be used to generate ply lay-up data such as, for example, the ply lay-up data presented in display 1500 in FIG. 15 and the ply lay-up data displayed in drawing 1600 in FIG. 16. This process may be implemented in a software component such as, for example, data extraction tool 700 in FIG. 7.

The process begins by receiving a location on a part (operation 2300). Next, the process creates an axis system at the location in the model of the part (operation 2302). This axis system has an axis that is normal to the surface at the location in the model in the part. In these examples, this axis may be a z-axis that is normal to the surface at the location and also may be referred to as a damage axis. This axis system may be parallel to a reference axis, such as reference axis 1542 in FIG. 15.

The process creates section cuts using the axis system (operation 2304). In these examples, these section cuts may take the form of planes that intersect the surface and plies below the surface. The process identifies points for core sampling (operation 2306). In these examples, the points are points for the section cuts. The identified points are stored in a file (operation 2308). In these examples, this file may be, for example, an extensible markup language file. The process saves the model of the part containing the axis system in the section cuts (operation 2310).

The process then creates a set of files based on the surface in the model of the part (operation 2312). These files are created from the points identified for core sampling. These files may be referred to as surface files. Each file in this set of files is based on a portion of the surface associated with an identified point. The process creates a master file (operation 2314). This master file ties together or identifies all of the files in the set of files. The collective set of files identifies locations for samples. Each file provides a location for core sampling to be performed. In other words, each file may correspond to a point identified in operation 2308.

The process selects an unprocessed file from the set of files using the master file (operation 2316). The process performs core sampling of data at the point identified in the file (operation 2318). The core sampling results in identifying core sample data for the point. This data may also be referred to as sampled data. The process stores the core sample data (operation 2320). This core sample data contains information regarding the surface and plies below the surface at the point identified by the file. A determination is made as to whether additional unprocessed files are present (operation 2322). If additional unprocessed files are present, the process returns to operation 2316.

Otherwise, the process creates an output file based on the stored core sample data (operation 2324), with the process terminating thereafter. In operation 2324, the output may take various forms. For example, the output may be stored in a portable document format file that may contain text, images, and two dimensional graphics that may be manipulated. Of course, in other advantageous embodiments, other types of formats may be used. In some formats, the file may include a three dimensional graphical image or model that may be manipulated.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a computer implemented method, apparatus, and computer program product for providing ply lay-up data for a composite part. A location on a composite part is received from a requester. Ply lay-up data is extracted for a section of the composite part within a three dimensional model containing the composite part to form extracted ply lay-up data. The extracted ply lay-up data is sent to the requester.

In this manner, some or all of the different advantageous embodiments may allow for an identification of ply layout data for use in performing maintenance operations. This identification of the ply layout data may be made without an operator or requester of the data having to access a three dimensional model. Instead, the operator may identify a location on the part for which a maintenance operation is needed and receive the ply lay-up data for that location. In these examples, a section or sections is returned containing the ply lay-up data.

The different advantageous embodiments may provide an ability to process the request for ply lay-up data using a tool to automatically generate the cuts. In this manner, the operator does not need to have access to the three dimensional model. Further, the operator also does not need to have knowledge of how to operate the applications used in creating the three dimensional models. Further, the different advantageous embodiments also provide an ability to restrict access to data in three dimensional models but still provide ply lay-up data.

The different embodiments also create output files that do not require obtaining export licenses for customers who might be in other countries because any sensitive information is not included. The output or ply lay-up data generated can be exported to other countries, not under embargoes, without export licenses.

Another feature provided by the different embodiments is the ability to only provide ply lay-up data on demand for a limited portion of the aircraft. Further, requests made by users can be tracked and access to data may be terminated or restricted if abuses are detected. For example, if a user makes requests for different portions of an aircraft that exceed some threshold, then the ability to receive ply lay-up data can be terminated.

The description of the different advantageous embodiments has been presented for purposes of illustration and description, and is not intended to be exhaustive or limited to the embodiments in the form disclosed. Many modifications and variations will be apparent to those of ordinary skill in the art. Although the different advantageous embodiments have been described with respect to aircraft, other advantageous embodiments may be applied to other types of objects. For example, other advantageous embodiments may be applied to a mobile platform, an aircraft, a spacecraft, an aquatic vehicle, a land vehicle, a stationary platform, a land-based structure, an aquatic-based structure, and a space-based structure.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method for generating a section cut in a model of a part, the computer implemented method comprising:
    identifying, using at least one processor, a location on the part from an object of the part;
    extracting, using the at least one processor, ply lay-up data for a section of the part within the model, the extracting comprising:
        creating an axis system at the location in the model of the part, wherein the axis system has an axis that is normal to a surface at the location in the model of the part;
        creating section cuts intersecting the surface and plies below the surface, wherein creating section cuts further comprises: intersecting a base surface supporting the plies with a plane; obtaining first coordinates by performing a first linear approximation of the base surface and plane intersection; identifying a ply from the ply lay-up data that is intersected by the plane; and obtaining second coordinates by performing a second linear approximation of the ply and plane intersection;
        identifying a plurality of sampling points on the surface based on the section cuts; and
        generating sampled data by performing core sampling using the plurality of sampling points;
    generating, using the at least one processor, an output file from the sampled data.

2. The computer implemented method of claim 1, wherein the creating the axis system comprises:
    creating a damage axis at the location in the model of the part, wherein the damage axis is normal to the surface of the part at the location in the model of the part.

3. The computer implemented method of claim 1 further comprising:
    storing the section cuts and the axis system in the model of the part.

4. The computer implemented method of claim 1 further comprising:
- storing the plurality of sampling points in a plurality of files; and
- creating a master file identifying the plurality of files.

5. The computer implemented method of claim 4, further comprising:
- selecting a file from the plurality of files using the master file to form a selected file;
- performing the core sampling of a point identified in the selected file, wherein information about a set of plies associated with the point is identified; and
- storing the information in the sampled data.

6. The computer implemented method of claim 5 further comprising:
- repeating the selecting step, the performing step, and the storing step until all of the plurality of files have been processed.

7. The method of claim 1 further wherein the first coordinates are relative to the plane, and further comprising the step of converting the first coordinates to another coordinate system.

8. The method of claim 1 wherein the step of identifying in a part application a location on the part comprises the steps of:
- displaying a three-dimensional object; and
- selecting the location on the three-dimensional object.

9. The method of claim 8 wherein the step of displaying the three-dimensional object further comprises excluding information selected from trade secret information and export-controlled information.

10. The method of claim 8 further comprising manipulating the three-dimensional object.

11. An apparatus comprising:
- a data processing system comprising a bus, a processor, and a memory, wherein a data extraction tool executes on the data processing system, wherein the data extraction tool is configured to:
- receive a location on a part;
- create an axis system at the location in a model of the part, wherein the axis system has an axis that is normal to a surface at the location in the model of the part;
- create section cuts intersecting the surface and plies below the surface, wherein creating section cuts further comprises: intersecting a base surface supporting the plies with a plane;
- obtain first coordinates by performing a first linear approximation of the base surface and plane intersection;
- identify a ply from ply lay-up data, wherein the ply is intersected by the plane; and
- obtain second coordinates by performing a second linear approximation of the ply and plane intersection;
- identify a plurality of sampling points on the surface based on the section cuts; and
- generating sampled data by performing core sampling using the plurality of sampling points.

12. The apparatus of claim 11, wherein the data extraction tool is capable of generating an output file from the sampled data.

13. The apparatus of claim 11, wherein the axis system has a damage axis that is normal to the surface of the part at the location in the model of the part.

14. The apparatus of claim 11, wherein the data extraction tool is further capable of storing the section cuts and the axis system in the model of the part.

15. The apparatus of claim 11, wherein the data extraction tool is further capable of storing the plurality of sampling points in a plurality files, and creating a master file identifying the plurality of files.

16. The apparatus of claim 11, wherein in performing the core sampling using the plurality of sampling points to generate the sampled data, the data extraction tool is capable of selecting a file from the plurality of files using the master file to form a selected file; performing the core sampling of a point identified in the selected file, wherein information about a set of plies associated with the point is identified; and storing the information in the sampled data.

17. The apparatus of claim 16, wherein the data extraction tool comprises:
- a core identification unit;
- a surface generation unit;
- a core sampling unit; and
- an output generation unit.

18. A non-transitory computer readable storage medium storing program code which, when executed by at least one processor, is configured to display on a display a three-dimensional object of a part and to identify a location on the three-dimensional object of the part, the program code comprising:
- program code configured to extract ply lay-up data for a section of the part within a model of the part, the program code that is configured to extract further comprising:
  - program sub-code configured to create an axis system at the location in the model of the part, wherein the axis system has an axis that is normal to a surface at the location in the model of the part;
  - program sub-code configured to create section cuts intersecting the surface and plies below the surface, wherein creating section cuts further comprises: intersecting a base surface supporting the plies with a plane; obtaining first coordinates by performing a linear approximation of the base surface and plane intersection; identifying a ply from the ply lay-up data that is intersected by the plane; and obtaining second coordinates by performing a second linear approximation of the ply and plane intersection; and
  - program sub-code configured to identify a plurality of sampling points on the surface based on the section cuts; and
- program code configured to generate sampled data by performing core sampling using the plurality of sampling points.

19. The non-transitory computer readable storage medium of claim 18,
- wherein the program code further comprises program code for generating an output file from the sampled data.

20. The non-transitory computer readable storage medium of claim 18, wherein the program code further comprises:
- program code for creating the axis system with a damage axis that is normal to the surface of the part at the location in the model of the part.

21. The non-transitory computer readable storage medium of claim 18, wherein the program code further comprises:
- program code for storing the section cuts and the axis system in the model of the part.

22. The non-transitory computer readable storage medium of claim 18, wherein the program code further comprises:
- program code for storing the plurality of sampling points in a plurality of files; and
- program code for creating a master file identifying the plurality of files.

23. The non-transitory computer readable storage medium of claim 18, wherein the program code further comprises:
  program code for selecting a file from the plurality of files using the master file to form a selected file;
  program code for performing the core sampling of a point identified in the selected file, wherein information about a set of plies associated with the point is identified; and
  program code for storing the information in the sampled data.

* * * * *